(12) United States Patent
Kato

(10) Patent No.: US 7,852,957 B2
(45) Date of Patent: Dec. 14, 2010

(54) WIRELESS TRANSMITTER AND WIRELESS RECEIVER

(75) Inventor: Yasuyuki Kato, Chiba (JP)

(73) Assignee: Sharp Kabushiki Kaisha, Osaka-Shi (JP)

(*) Notice: Subject to any disclaimer, the term of this patent is extended or adjusted under 35 U.S.C. 154(b) by 536 days.

(21) Appl. No.: 11/883,293

(22) PCT Filed: Jan. 5, 2006

(86) PCT No.: PCT/JP2006/000044

§ 371 (c)(1),
(2), (4) Date: Jul. 30, 2007

(87) PCT Pub. No.: WO2006/080180

PCT Pub. Date: Aug. 3, 2006

(65) Prior Publication Data

US 2008/0117998 A1    May 22, 2008

(30) Foreign Application Priority Data

Jan. 31, 2005    (JP)    ............... 2005-024272

(51) Int. Cl.
  *H04L 27/28*    (2006.01)
  *H04L 1/02*    (2006.01)
(52) U.S. Cl. .................... 375/260; 375/267
(58) Field of Classification Search ............ 375/260, 375/267, 254, 284, 285; 370/200, 329, 252, 370/310, 328; 455/67.11, 69
See application file for complete search history.

(56) References Cited

U.S. PATENT DOCUMENTS

| 6,985,752 | B2 | 1/2006 | Takano et al. |
| 2002/0173312 | A1 | 11/2002 | Takano et al. |
| 2004/0004998 | A1 | 1/2004 | Fitton et al. |
| 2005/0128976 | A1* | 6/2005 | Uehara et al. ............... 370/329 |
| 2005/0232202 | A1 | 10/2005 | Yano et al. |
| 2008/0274700 | A1* | 11/2008 | Li ........................... 455/67.11 |

FOREIGN PATENT DOCUMENTS

| CN | 1387328 A | 12/2002 |
| JP | 2001-339458 A | 12/2001 |
| JP | 2003-169036 A | 6/2003 |
| JP | 2004-023145 A | 1/2004 |
| JP | 2005-303850 A | 10/2005 |
| WO | WO-03/071730 A1 | 8/2003 |

* cited by examiner

*Primary Examiner*—Khai Tran
(74) *Attorney, Agent, or Firm*—Birch, Stewart, Kolasch & Birch, LLP

(57) ABSTRACT

Effective throughput is enhanced by minimizing a transmission amount of modulation information per frame.

A storage part storing information indicating an adaptive modulation level of a modulation parameter, a difference information output part that generates difference information with one bit indicating a difference between the adaptive modulation level of a modulation parameter used for adaptive modulation in a previous frame and that of a modulation parameter used for adaptive modulation in a current frame, and a frame generation part generating a frame using the difference information as modulation information to notify a receiving side of the modulation parameter used for adaptive modulation of a subcarrier or subcarrier group in the current frame, are provided.

15 Claims, 22 Drawing Sheets

| ADAPTIVE MODULATION LEVEL (MCS) | MODULATION METHOD | ERROR CORRECTION CODING RATE |
|---|---|---|
| 1 | not used | |
| 2 | BPSK | 1/2 |
| 3 | BPSK | 3/4 |
| 4 | QPSK | 1/2 |
| 5 | QPSK | 3/4 |
| 6 | 16QAM | 1/2 |
| 7 | 16QAM | 3/4 |
| 8 | 64QAM | 1/2 |
| 9 | 64QAM | 3/4 |
FIG.21
PRIOR ART
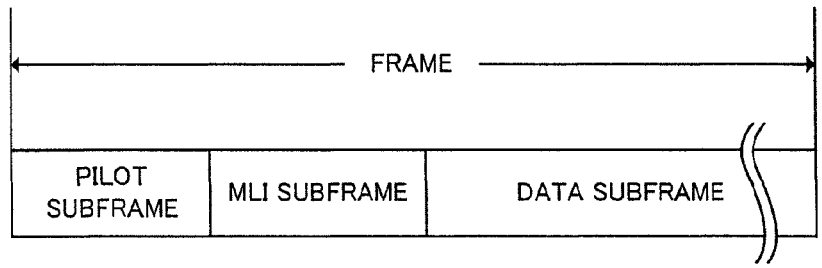
FIG.22A
PRIOR ART
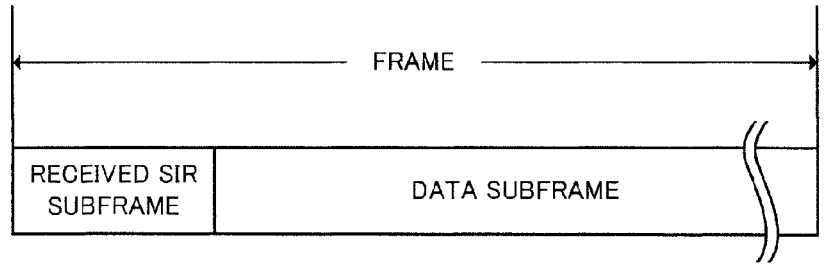
FIG.22B
PRIOR ART

WIRELESS TRANSMITTER AND WIRELESS RECEIVER

TECHNICAL FIELD

The present invention relates to a wireless transmitter and wireless receiver applied to a wireless communication system that performs wireless communication by controlling a modulation scheme and coding rate for each subcarrier in accordance with radio propagation path conditions.

BACKGROUND ART

High-throughput communication methods have been studied and developed, whose transmission efficiency is increased through control of a modulation scheme and coding rate in a downlink of high-speed mobile communication in accordance with radio propagation path conditions of the downlink between a wireless base station and wireless mobile station. Further, still higher-throughput communication methods have been studied and developed, in which modulation and code scheme (hereinafter referred to as "MCS") is changed for each subcarrier in accordance with radio propagation path conditions.

FIG. 20 is a diagram showing a configuration of conventional modulation information. Since, in a method of adaptively modulating each subcarrier depending on radio propagation path conditions, modulation and code scheme is periodically changed for each subcarrier, a base station must notify a mobile station of modulation information such as changed modulation and code scheme for each subcarrier. Modulation information is often in a form of mapping of a combination of the modulation scheme and coding rate as shown in FIG. 21. An information amount of several bits is assigned to each subcarrier and modulation information in which modulation and code schemes of all subcarriers are described (Multilevel Information: hereinafter referred to as MLI) is transmitted from the base station side to the mobile station side together with data. In the downlink, as shown in FIG. 22A, a frame consisting of a pilot subframe, MLI subframe, and data subframe is transmitted. The mobile station analyzes the MLI to check modulation and code scheme of each subcarrier before performing demodulation/decoding. In an uplink from the mobile station to the base station, as shown in FIG. 22B, a frame consisting of a received SIR subframe and data subframe is transmitted.

In Japanese Patent Laid-Open No. 2003-169036, as shown in FIG. 23, a group of blocks (a group of subcarrier groups), each consisting of several subcarriers, is formed in accordance with received power values of a plurality of subcarriers, modulation and code scheme is determined for each block, and a subcarrier number at a specific position in each block (subcarrier number at the head position or that of the rear position of a block) and the determined modulation scheme and coding rate are notified.

Patent Document 1: Japanese Patent Laid-Open No. 2003-169036

DISCLOSURE OF THE INVENTION

However, since the information amount of several bits is assigned to each subcarrier, the information amount of conventional MLI increases in accordance with the number of subcarriers. Many communication systems of adaptive modulation method currently being considered assume systems using several hundreds of subcarriers and the modulation information amount of several kilobits will be needed to transmit MLI to several hundreds of subcarriers. Thus, even if the number of subcarriers is increased in anticipation of increased throughput, the information amount of MLI will also increase. Further, since the modulation method is periodically changed in the adaptive modulation method, modulation information assumes a high proportion and an expected increase in throughput cannot be anticipated, resulting in low transmission efficiency.

Also, in the technology disclosed in Japanese Patent Laid-Open No. 2003-169036, received power values vary enormously at locations where propagation path conditions vary enormously due to influences of, for example, frequency fading and thus the number of subcarriers to be blocked tend to be less to increase the number of blocks to be blocked, and the information amount of MLI increases with an increasing number of blocks, counteracting a reduction effect of the information amount of modulation. Therefore, conversely if the number of blocks is large, the information amount of MLI increases in some cases compared with the case of transmitting modulation information for each subcarrier due to notification of the subcarrier number and modulation method. Also when subcarriers are blocked, the MLI size varies depending on radio propagation path conditions and the size of one frame also varies, resulting in inefficient data transmission.

The present invention has been made in view of such circumstances and an object thereof is to provide a wireless transmitter and wireless receiver that can increase effective throughput by minimizing a transmission amount of modulation information per frame in a wireless communication system in which adaptive modulation is performed for each subcarrier or each subcarrier group formed of a plurality of subcarriers.

(1) To achieve the above object, the present invention has taken steps shown below. That is, a wireless transmitter according to the present invention is a wireless transmitter that adaptively determines one modulation parameter from among a plurality of modulation parameters with different adaptive modulation levels based on an estimation result of propagation path conditions and performs adaptive modulation using the determined modulation parameter for each subcarrier or each subcarrier group consisting of a plurality of subcarriers, the wireless transmitter comprising: a storage part storing information indicating the adaptive modulation level of the determined modulation parameter; a difference information output part that generates and outputs difference information indicating a difference between the adaptive modulation level of the modulation parameter used for adaptive modulation in a previous frame and that of the modulation parameter used for adaptive modulation in a current frame with one bit based on the information stored in the storage part; and a frame generation part generating a frame using the output difference information as modulation information to notify a receiving side of the modulation parameter used for performing adaptive modulation of the subcarrier or the subcarrier group in the current frame.

Thus, difference information generated with one bit is used as modulation information to notify a receiving side of the modulation parameter used for performing adaptive modulation of the subcarrier or the subcarrier group in the current frame and therefore, effective throughput can be enhanced by minimizing the transmission amount of modulation information per frame.

(2) Also, the wireless transmitter according to the present invention is a wireless transmitter that adaptively determines one modulation parameter from among a plurality of modulation parameters with different adaptive modulation levels based on an estimation result of propagation path conditions and performs adaptive modulation using the determined modulation parameter for each subcarrier or each subcarrier group consisting of a plurality of subcarriers, the wireless transmitter comprising: a storage part storing information indicating the adaptive modulation level of the determined modulation parameter; a difference information output part that generates and outputs difference information indicating a difference between the adaptive modulation level of the modulation parameter used for adaptive modulation in a previous frame and that of the modulation parameter used for adaptive modulation in a current frame with one bit based on information stored in the storage part; a selecting part that compares the estimation result of propagation path conditions with a predetermined threshold and selects one of the output difference information and information indicating the modulation parameter as modulation information to notify a receiving side of the modulation parameter used for performing adaptive modulation of the subcarrier or the subcarrier group in the current frame; and a frame generation part generating a frame using one of the selected difference information and information indicating the modulation parameter.

Thus, the estimation result of propagation path conditions and a predetermined threshold are compared, one of the difference information generated with one bit and information indicating the modulation parameter is selected as modulation information to notify a receiving side of the modulation parameter used for performing adaptive modulation of the subcarrier or the subcarrier group, and one of the selected difference information and information indicating the modulation parameter and therefore, if propagation path conditions are good, performance throughput can be enhanced by using difference information as modulation information to minimize the transmission amount of modulation information per frame.

(3) Also, in the wireless transmitter according to the present invention, the frame generation part causes the frame to contain information indicating that the modulation information is one of the difference information and information indicating the modulation parameter.

Thus, information indicating that the modulation information is one of the difference information and information indicating the modulation parameter is contained in the frame and therefore, the receiving side can be notified of which modulation information is used.

(4) Also, in the wireless transmitter according to the present invention, the difference information indicates an increase or decrease of the adaptive modulation level.

Thus, the difference information indicates an increase or decrease of the adaptive modulation level and therefore, the receiving side can easily grasp the adaptive modulation level of the modulation parameter used for demodulation of the current frame by grasping that of the modulation parameter used in the previous frame. Accordingly, the transmission amount of modulation information per frame can be minimized to enhance effective throughput.

(5) Also, in the wireless transmitter according to the present invention, the difference information indicates change or maintenance of the adaptive modulation level.

Thus, the difference information indicates change or maintenance of the adaptive modulation level and therefore, the receiving side can easily grasp the adaptive modulation level of the modulation parameter used for demodulation of the current frame by grasping that of the modulation parameter used in the previous frame. Accordingly, the transmission amount of modulation information per frame can be minimized to enhance effective throughput.

(6) Also, in the wireless transmitter according to the present invention, the modulation information, when being all zero or one, is an initial frame used at starting communication or a frame used at reset.

Thus, the receiving side can be notified of an initial frame.

(7) Also, in the wireless transmitter according to the present invention, the modulation parameter contains at least one of a modulation method of each subcarrier, coding rate of transmission data, and encoding method of transmission data, and information indicating that no subcarrier exists or a subcarrier is a carrier hole carrying no information.

Thus, at least one of a modulation method of each subcarrier, coding rate of transmission data, and encoding method of transmission data, and information indicating that no subcarrier exists or a subcarrier is a carrier hole carrying no information are used as the modulation parameters and therefore, a wireless transmitter according to the present invention and a wireless communication system constituted by the wireless transmitter can be realized without considerably modifying a conventional wireless communication apparatus and wireless communication system. As a result, it becomes possible to reduce costs for their realization and also shorten a period of time required for their realization.

(8) Also, a wireless receiver used in a wireless communication system that adaptively determines one modulation parameter from among a plurality of modulation parameters with different adaptive modulation levels based on an estimation result of propagation path conditions and performs adaptive modulation using the determined modulation parameter for each subcarrier or each subcarrier group consisting of a plurality of subcarriers, the wireless receiver comprising: a receiving part receiving a frame transmitted from a transmitting side; an extraction part extracting 1-bit difference information indicating a difference between the adaptive modulation level of the modulation parameter used for adaptive modulation in a previous frame and that of the modulation parameter used for adaptive modulation in a current frame as modulation information to notify a receiving side of the modulation parameter used for performing adaptive modulation of the subcarrier or the subcarrier group in the current frame from the received frame; and a determination part determining the adaptive modulation level of the modulation parameter used for demodulation in the current frame based on the extracted difference information and the adaptive modulation level of the modulation parameter used for demodulation in the previous frame.

Thus, the adaptive modulation level of the modulation parameter used for demodulation in the current frame is determined based on the difference information generated with one bit and the adaptive modulation level of the modulation parameter used for demodulation in the previous frame and therefore, modulation information conventionally used for indicating the modulation parameter becomes unnecessary. Accordingly, the transmission amount of modulation information per frame can be minimized to enhance effective throughput.

(9) Also, a wireless receiver used in a wireless communication system that adaptively determines one modulation parameter from among a plurality of modulation parameters with different adaptive modulation levels based on an estimation result of propagation path conditions and performs adaptive modulation using the determined modulation parameter for each subcarrier or each subcarrier group consisting of a plurality of subcarriers, the wireless receiver comprising: a receiving part receiving a frame transmitted from a transmitting side; an extraction part extracting one of 1-bit difference information indicating a difference between the adaptive modulation level of the modulation parameter used for adaptive modulation in a previous frame and that of the modulation parameter used for adaptive modulation in a current frame and information indicating the modulation parameter as modulation information to notify a receiving side of the modulation parameter used for performing adaptive modulation of the subcarrier or the subcarrier group in the current frame from the received frame and extracting information indicating that the modulation information is one of the difference information and information indicating the modulation parameter from the received frame; and a determination part determining, if the modulation information is the difference information, the adaptive modulation level of the modulation parameter used for demodulation in the current frame based on the extracted difference information and the adaptive modulation level of the modulation parameter used for demodulation in the previous frame.

Thus, if information indicating that the modulation information is difference information is extracted from the frame, the adaptive modulation level of the modulation parameter used for demodulation in the current frame is determined based on the difference information and the adaptive modulation level of the modulation parameter used for demodulation in the previous frame and therefore, if propagation path conditions are good, modulation information conventionally used for indicating the modulation parameter becomes unnecessary. Accordingly, the transmission amount of modulation information per frame can be minimized to enhance effective throughput. If propagation path conditions are bad, information indicating the modulation parameter is used as modulation information and therefore, the receiving side can directly be notified of which modulation parameter is used, as conventionally the case.

(10) Also, in the wireless receiver according to the present invention, the difference information indicates an increase or decrease of the adaptive modulation level.

Thus, the difference information indicates an increase or decrease of the adaptive modulation level and therefore, the receiving side can easily grasp the adaptive modulation level of the modulation parameter used for demodulation of the current frame by grasping that of the modulation parameter used in the previous frame. Accordingly, the transmission amount of modulation information per frame can be minimized to enhance effective throughput.

(11) Also, in the wireless receiver according to the present invention, the difference information indicates change or maintenance of the adaptive modulation level.

Thus, the difference information indicates change or maintenance of the adaptive modulation level and therefore, the receiving side can easily grasp the adaptive modulation level of the modulation parameter used for demodulation of the current frame by grasping that of the modulation parameter used in the previous frame. Accordingly, the transmission amount of modulation information per frame can be minimized to enhance effective throughput.

(12) Also, in the wireless receiver according to the present invention, if the difference information indicates change in the adaptive modulation level, the determination part determines the adaptive modulation level of the modulation parameter used for demodulation in the current frame, based on a threshold, which is a threshold of the adaptive modulation level determined by the estimation result of propagation path conditions and also a threshold of the adaptive modulation level of the modulation parameter used for demodulation in the previous frame, and the estimation result of propagation path conditions in the current frame.

Thus, the adaptive modulation level of the modulation parameter used for demodulation in the current frame can be determined based on the difference information indicating change or maintenance of the adaptive modulation level, a threshold of the adaptive modulation level of the modulation parameter used for demodulation in the previous frame, and the estimation result of propagation path conditions in the current frame and therefore, the transmission amount of modulation information per frame can be minimized to enhance effective throughput.

(13) Also, the wireless receiver according to the present invention further comprises an estimation result storage part storing the estimation result of propagation path conditions, wherein, if the difference information indicates change in the adaptive modulation level, the determination part determines the adaptive modulation level of the modulation parameter used for demodulation in the current frame, based on the estimation result of propagation path conditions in the previous frame stored in the estimation result storage part and that of propagation path conditions in the current frame.

Thus, the adaptive modulation level of the modulation parameter used for demodulation in the current frame can be determined based on the difference information indicating change or maintenance of the adaptive modulation level, the estimation result of propagation path conditions in the previous frame, and that of propagation path conditions in the current frame and therefore, the transmission amount of modulation information per frame can be minimized to enhance effective throughput.

(14) Also, a base station apparatus comprises the wireless transmitter according to any of claims 1 to 7.

Thus, difference information generated with one bit is used as modulation information to notify the receiving side of the modulation parameter used for performing adaptive modulation of the subcarrier or the subcarrier group in the current frame and therefore, the transmission amount of modulation information per frame can be minimized to enhance effective throughput.

(15) Also, a mobile station apparatus comprises the wireless receiver according to any of claims 8 to 13.

Thus, the adaptive modulation level of the modulation parameter used for demodulation in the current frame is determined based on difference information generated with one bit and the adaptive modulation level of the modulation parameter used for demodulation in the previous frame and therefore, modulation information conventionally used for indicating the modulation parameter becomes unnecessary. Accordingly, the transmission amount of modulation information per frame can be minimized to enhance effective throughput.

According to the present invention, difference information generated with one bit is used as modulation information to notify a receiving side of a modulation parameter used for performing adaptive modulation of a subcarrier or a subcarrier group in a current frame and therefore, the transmission amount of modulation information per frame can be minimized to enhance effective throughput.

BRIEF DESCRIPTION OF THE DRAWINGS

FIG. 21 is a diagram showing an example of an adaptive modulation level (MCS) showing a combination of a modulation scheme and coding rate.

FIG. 22A is a diagram showing a frame structure example of a downlink and FIG. 22B is a diagram showing a frame structure example of an uplink.

BEST MODE FOR CARRYING OUT THE INVENTION

Next, embodiments of the present invention will be described with reference to drawings. In the embodiments of the present invention, difference information between an MCS (Modulation and Code Scheme, hereinafter referred to as "MCS") level of an adaptive modulation level of each subcarrier in a previous frame and that of all subcarriers determined in a current frame is represented with one bit for each subcarrier to generate MLI (Multilevel Information, hereinafter referred to as "MLI"), a base station notifies a mobile station of MLI, and the mobile station determines the MCS level of each subcarrier based on the MLI to demodulate and decode the modulation method and encoded data of each subcarrier.

The mobile station estimates a received SIR (Signal to Interference Power Ratio) during reception based on a known pilot signal of a downlink. The estimated received SIR is transmitted to the base station side via an uplink. After receiving the data transmitted from the mobile station, the base station demultiplexes a received SIR section from a data section, calculates a current MCS level for each subcarrier from the received SIR estimated by the mobile station and the previous MCS level, performs modulation/encoding of each subcarrier according to the calculated MCS level, and generates MLI using a difference between the previous MCS level and the current MCS level as modulation information to transmit the MLI to the mobile station by multiplexing the MLI with data and the pilot signal.

After receiving data from the base station, the mobile station demultiplexes the data into an MLI section, data section, and pilot signal section. The pilot section is used for estimating a received SIR and the data section is sent to a higher layer. Then, the MLI is used to determine the MCS level performed on data from the previous MCS and estimated received SIR and demodulation/decoding is performed for each subcarrier according to the determined MCS level to restore the data.

First Embodiment

In a first embodiment, the above difference information generated with one bit means raising or lowering the MCS level. If the difference information is one, for example, the MCS level is raised by one level. If, on the other hand, the difference information is zero, the MCS level is lowered by one level. The base station compares the received SIR from the mobile station with a threshold of the previous MCS level. If the received SIR is larger than the threshold, the base station raises the MCS level, and if the received SIR is smaller than the threshold, the base station lowers the MCS level to transmit difference information indicating the raised/lowered MCS level to the mobile station. Based on the difference information, the mobile station determines whether to raise or lower the MCS level.

Figure 1:
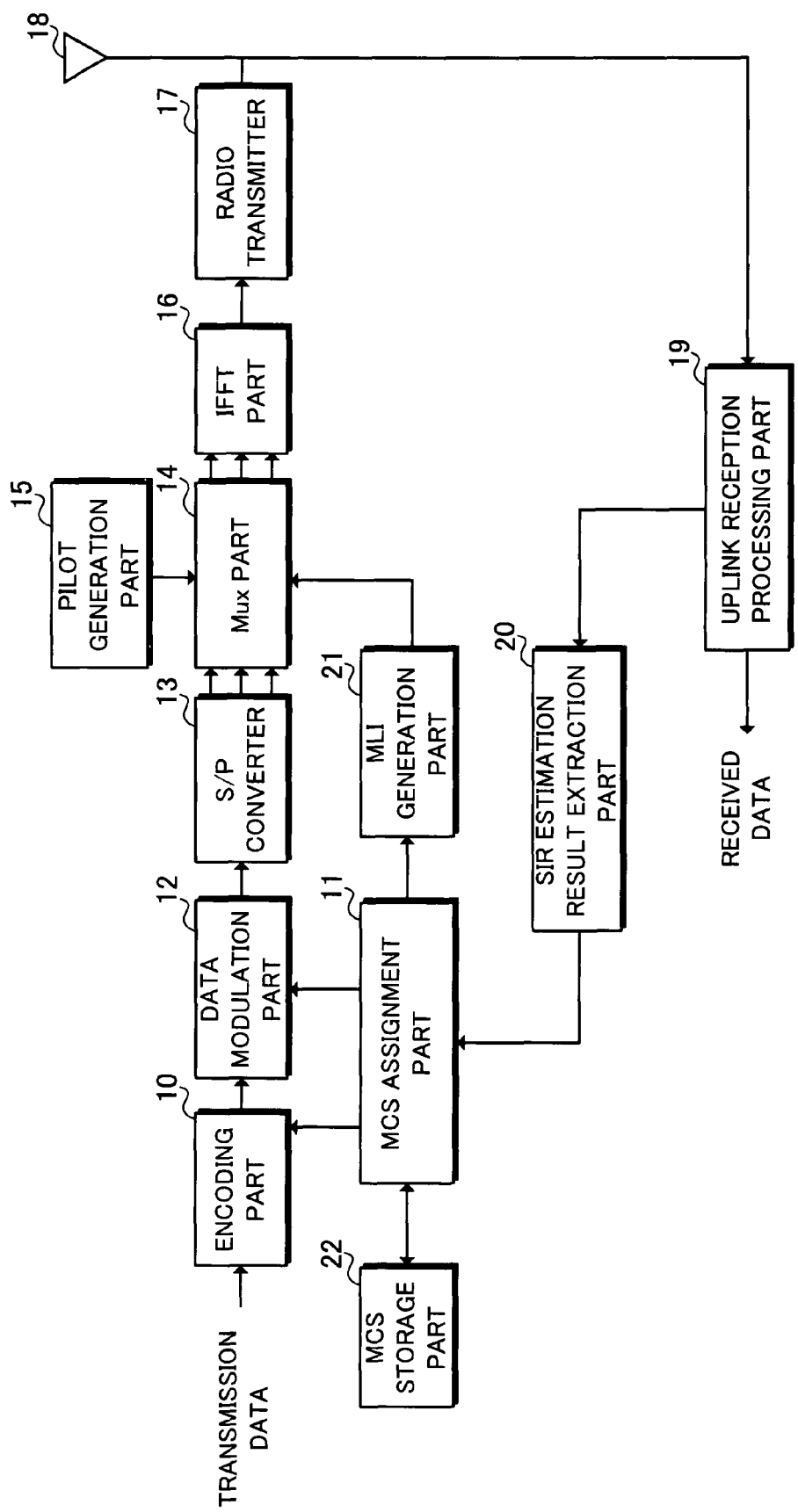
FIG. 1 is a block diagram showing a schematic configuration of a base station according to a first embodiment.

FIG. 1 is a block diagram showing a schematic configuration of a base station according to the first embodiment. Transmission data is input into an encoding part 10 to be encoded at a coding rate instructed by an MCS assignment part 11 using a coding method such as turbo coding. The encoded data is modulated by a data modulation part 12 by a modulation method instructed by the MCS assignment part 11. The modulation scheme and coding rate instructed by the MCS assignment part 11 are instructed in combinations of the modulation scheme and coding rate as shown in FIG. 21. There can be any number of combinations of the modulation scheme and coding rate.

Modulated data from the data modulation part 12 is converted into parallel data according to the number of subcarriers by a serial-parallel converter (S/P converter) 13. The modulated data parallel-converted according to the number of subcarriers is input into a multiplexing part (Mux part) 14 to be multiplexed with a pilot signal input by a pilot generation part 15 to enable the mobile station to estimate a received SIR and modulation and code scheme information (MLI: Multilevel Information) in which the modulation scheme and coding rate of each subcarrier are written, and inverse-Fourier transformed by an inverse fast Fourier transform part (IFFT part) 16 into an OFDM signal to be forwarded to a radio transmitter 17. The radio transmitter 17 up-converts the OFDM signal into a radio frequency band to transmit the signal to the mobile station from an antenna 18 while maintaining transmission power of each subcarrier constant.

In an uplink reception processing part 19, data from the mobile station is received, the received data and an SIR estimation result estimated by the mobile station are demultiplexed, and then the SIR estimation result is forwarded to an SIR estimation result extraction part 20. A reception mode of a demodulation part of the base station needs not necessarily be equipped with capability of adaptive modulation reception. The SIR estimation result extraction part 20 performs demodulation processing of modulation processing or the like performed on an SIR estimation result to forward the SIR estimation result to the MCS assignment part 11. The MCS assignment part 11 determines MCS of each subcarrier from the SIR estimation result and instructs the coding rate and modulation method to the encoding part 10 and data modulation part 12. The MCS assignment part 11 also generates difference information between the previous MCS of each subcarrier and the current MCS of each subcarrier with one bit to deliver the difference information to an MLI generation part 21. When MCS is determined, an MCS storage part 22 delivers the previous MCS information to the MCS assignment part 11 and stores the determined MCS information.

The above MCS assignment part 11 constitutes a difference information output part, the MCS storage part 22 constitutes a storage part, and the Mux part 14 and the MLI generation part 21 constitute a frame generation part.

The MLI generation part 21 assembles difference information of MCS of each subcarrier, performs modulation and encoding using a modulation scheme and coding rate so that the mobile station in any environment can receive, and then delivers the generated MLI to the Mux part 14. Incidentally, the modulation scheme and coding rate used by the MLI generation part are fixed by being determined in advance between the base station and mobile station and MLI must be receivable in whatever environment the mobile station is located and thus, MLI with a modulation level as low as possible (such as BPSK and QPSK) and a low coding rate is desirable.

Figure 2:
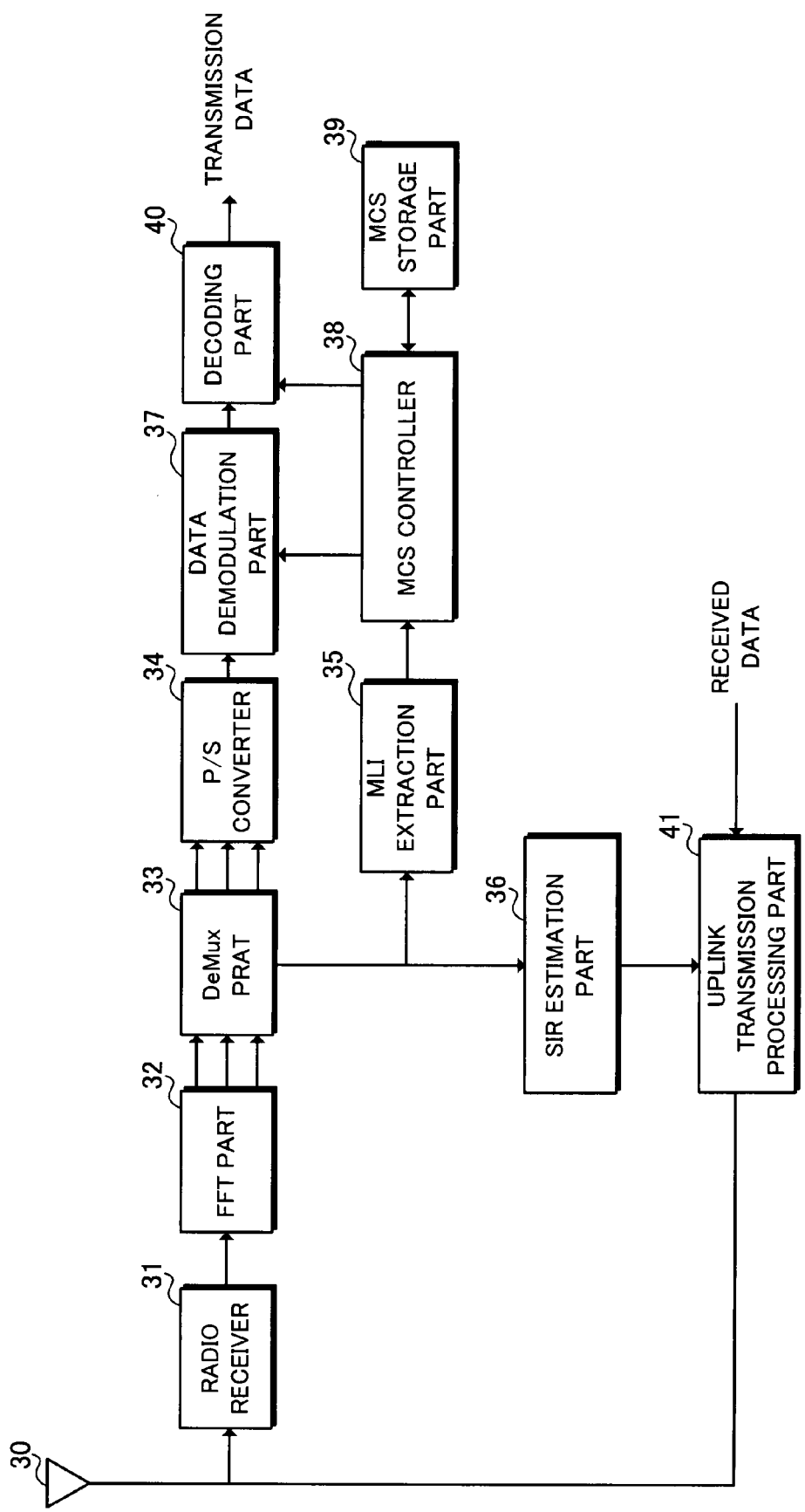
FIG. 2 is a block diagram showing a schematic configuration of a mobile station according to the first embodiment.

FIG. 2 is a block diagram showing the schematic configuration of a mobile station according to the first embodiment. The mobile station according to the first embodiment receives a radio signal from the base station via an antenna 30 and a radio receiver 31, down-converts the radio signal in the radio frequency band into an IF frequency band to forward the converted signal to a fast Fourier transform part (FFT part) 32. The FFT part 32 performs Fourier transform to convert an OFDM signal back into modulated data. A DeMux part 33 demultiplexes multiplexed modulated data to forward the modulated data, MLI and a pilot signal to a parallel-serial converter (P/S converter) 34, an MLI extraction part 35, and an SIR estimation part 36, respectively. In the parallel-serial converter (P/S converter) 34, the modulated data parallel-processed according to the number of subcarriers, is parallel-serial converted back into a serial modulated data. In a data demodulation part 37, the modulated data is demodulated by an instructed demodulation method following instructions of an MCS controller 38 back into an encoded data. An MCS storage part 39 stores MCS information and delivers the previous MCS information to the MCS controller 38.

In a decoding part 40, the encoded data is decoded by an instructed method following instructions of the MCS controller 38 back into original data. In the MLI extraction part 35, demodulation and decoding processing to convert back modulation and coding processing is performed on MLI in the base station to forward MLI data to the MCS controller 38.

In the MCS controller 38, the current MCS of each subcarrier is analyzed based on the MLI data and the previous MCS information of each subcarrier to determine MCS. The MCS controller 38 also controls the data demodulation part 37 and decoding part 40.

The SIR estimation part 36 estimates a received SIR based on a pilot signal and delivers the SIR estimation result to an uplink transmission processing part 41. In the uplink transmission processing part 41, transmission data and the SIR estimation result are multiplexed and converted into a radio signal before being transmitted to the base station via the antenna 30.

The antenna 30 and radio receiver 31 constitute a receiving part, the MLI extraction part 35 constitutes an extraction part, and the MCS controller 38 constitutes a determination part.

Incidentally, adaptive modulation control may not be used for communication control of an uplink on the base station receiving side and the mobile station transmitting side.

Figure 3:
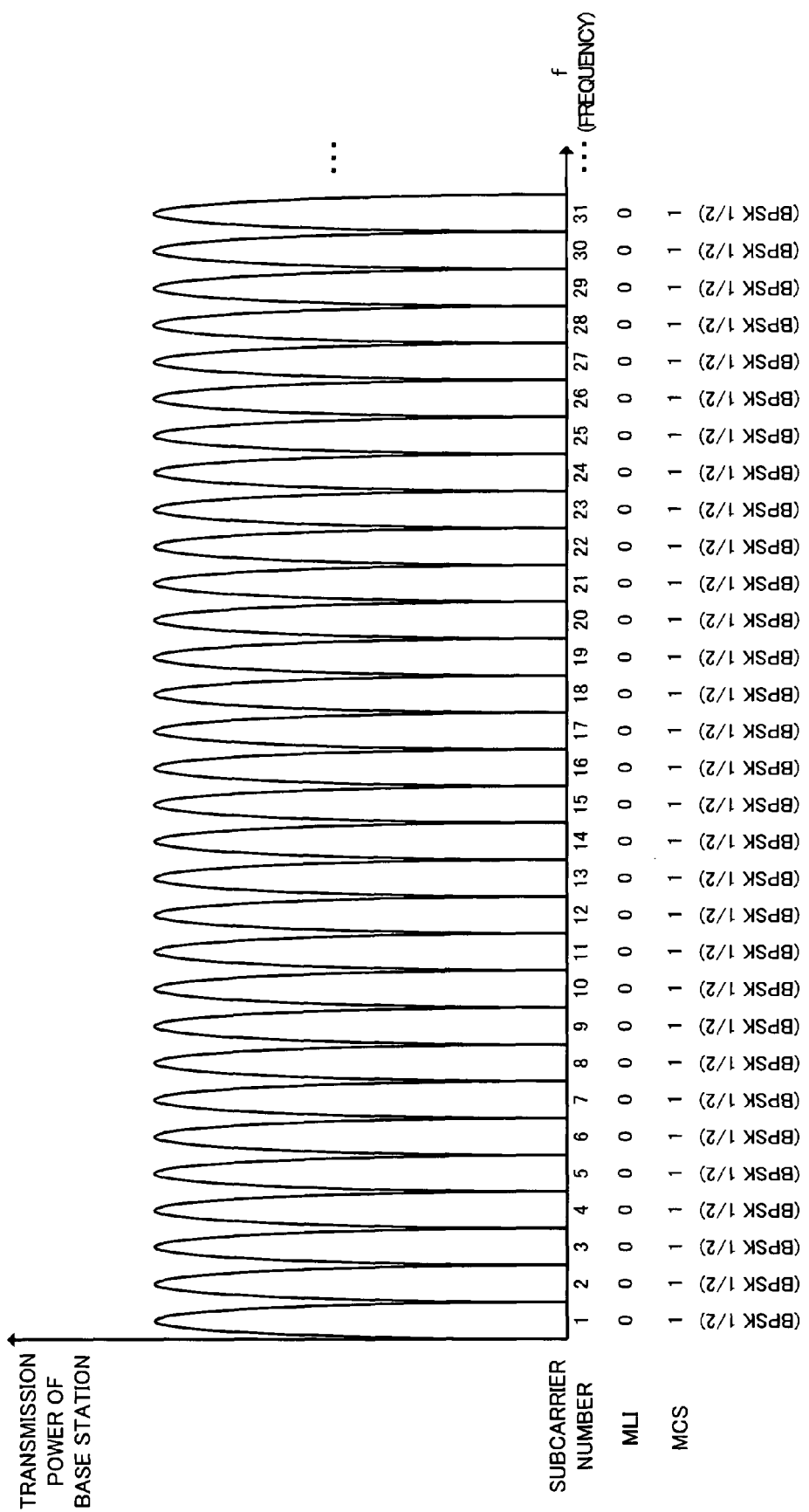
FIG. 3 is a diagram (during mobile station transmission) showing MCS, MLI, and transmission power at startup and reset in the first embodiment.
Figure 4:
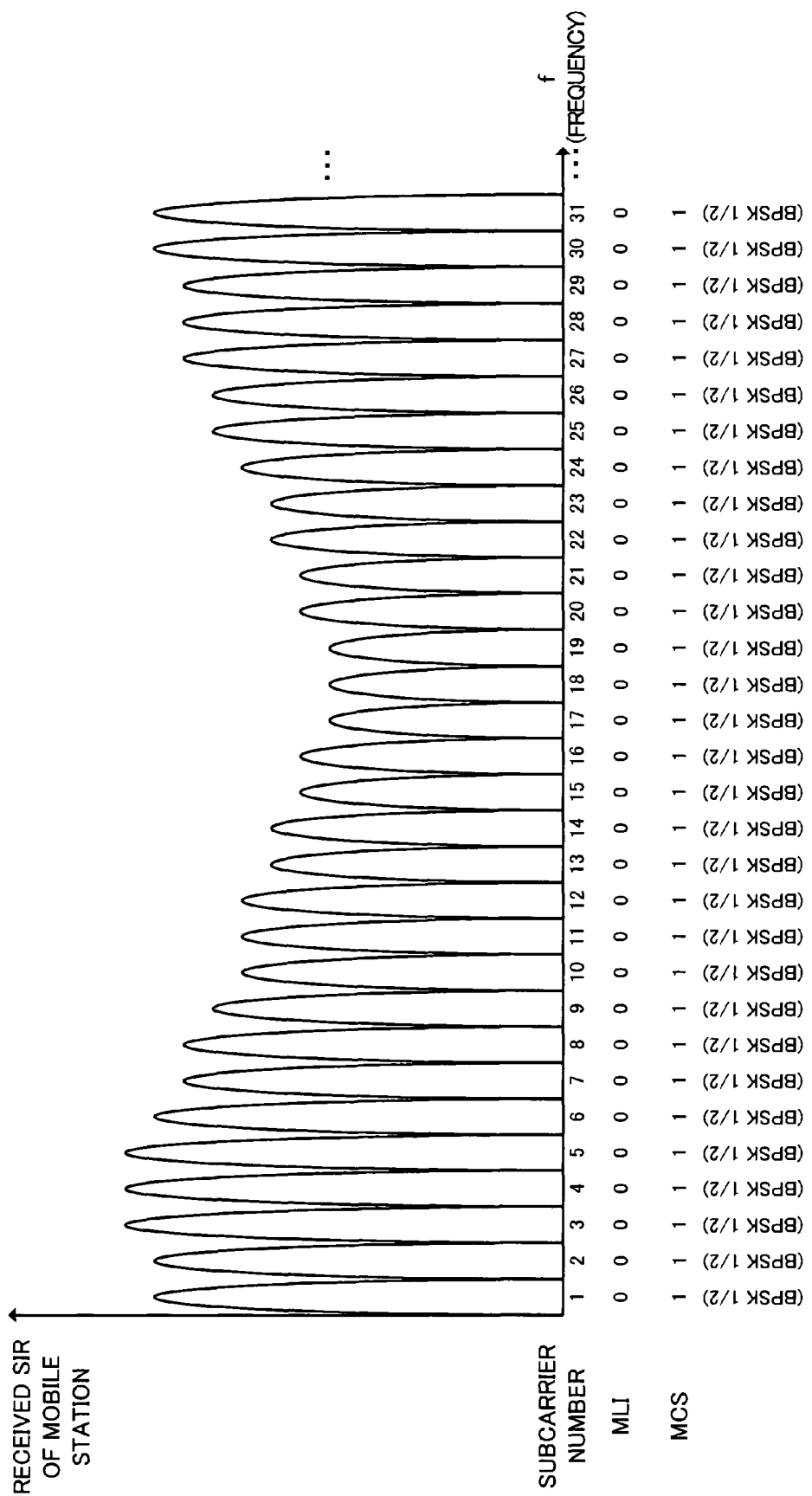
FIG. 4 is a diagram (during mobile station reception) showing MCS, MLI, and received power at startup and reset in the first embodiment.

Next, an algorithm for determining an MCS level and generating MLI by the base station configured as shown above will be described. Here, the modulation method of data received first by the mobile station is assumed to be BPSK or QPSK whose modulation level is low so that the MCS level of each subcarrier is constant and data can be received by a terminal in any environment. In that case, as shown in FIGS. 3 and 4, MLI has a format in which all bits have zero like 0000 . . . 0000 or all bits have one and the base station periodically generates MLI for the mobile station to access the base station. MLI in this format is also used as reset MLI to be used to reset the MCS level under abnormal conditions.

Figure 5:
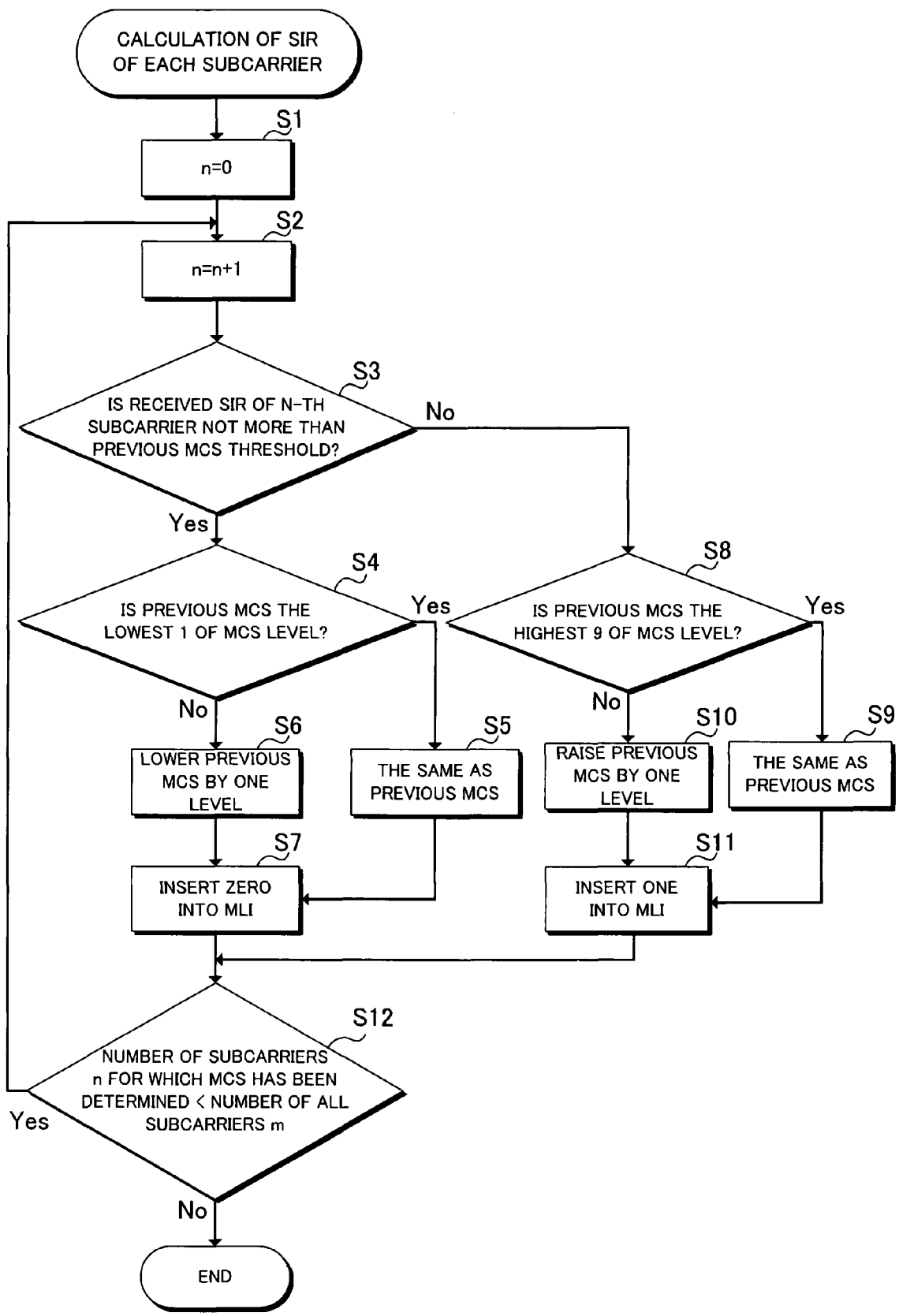
FIG. 5 is a flow chart showing operations of the base station according to the first embodiment.

FIG. 5 is a flow chart showing operations of the base station according to the first embodiment. First, the base station starts with a subcarrier number n set as n=0 (step S1), adds one ton (step S2), and, based on the received SIR estimated by the mobile station, compares the threshold of the previous MCS level of subcarrier 1 and the current received SIR value for the subcarrier 1 (step S3). If, as a result of comparison, the received SIR is smaller, whether or not the previous MCS level of subcarrier 1 is the lowest 1 (carrier hole) of the MCS level is checked (step S4).

If, in step S4, the previous MCS is one, MCS is determined to remain unchanged at one (step S5). If the previous MCS is not one, the MCS level is lowered by one level from the previous MCS level and the MCS level is determined (step S6). Then, zero is inserted into MLI (step S7).

On the other hand, in step S3, if, as a result of comparing the threshold of the previous MCS level of subcarrier 1 and the current received SIR value, the received SIR is larger, whether or not the previous MCS level of subcarrier 1 is the highest 9 of the MCS level (64QAM ¾) is checked (step S8). If the previous MCS level is nine, the MCS level is determined to remain unchanged (step S9) and, if the previous MCS level is not nine, the MCS level is determined to be lowered by one level from the previous MCS level (step S10), and then one is inserted into MLI (step S11).

Next, whether or not MCS is determined for all subcarriers is checked (step S12). If there is any remaining subcarrier, the above determination method is repeatedly applied to each of remaining subcarriers to determine the MCS levels of all subcarriers and create MLI, and adaptive modulation is performed by controlling the modulation scheme and coding rate.

Figure 6:
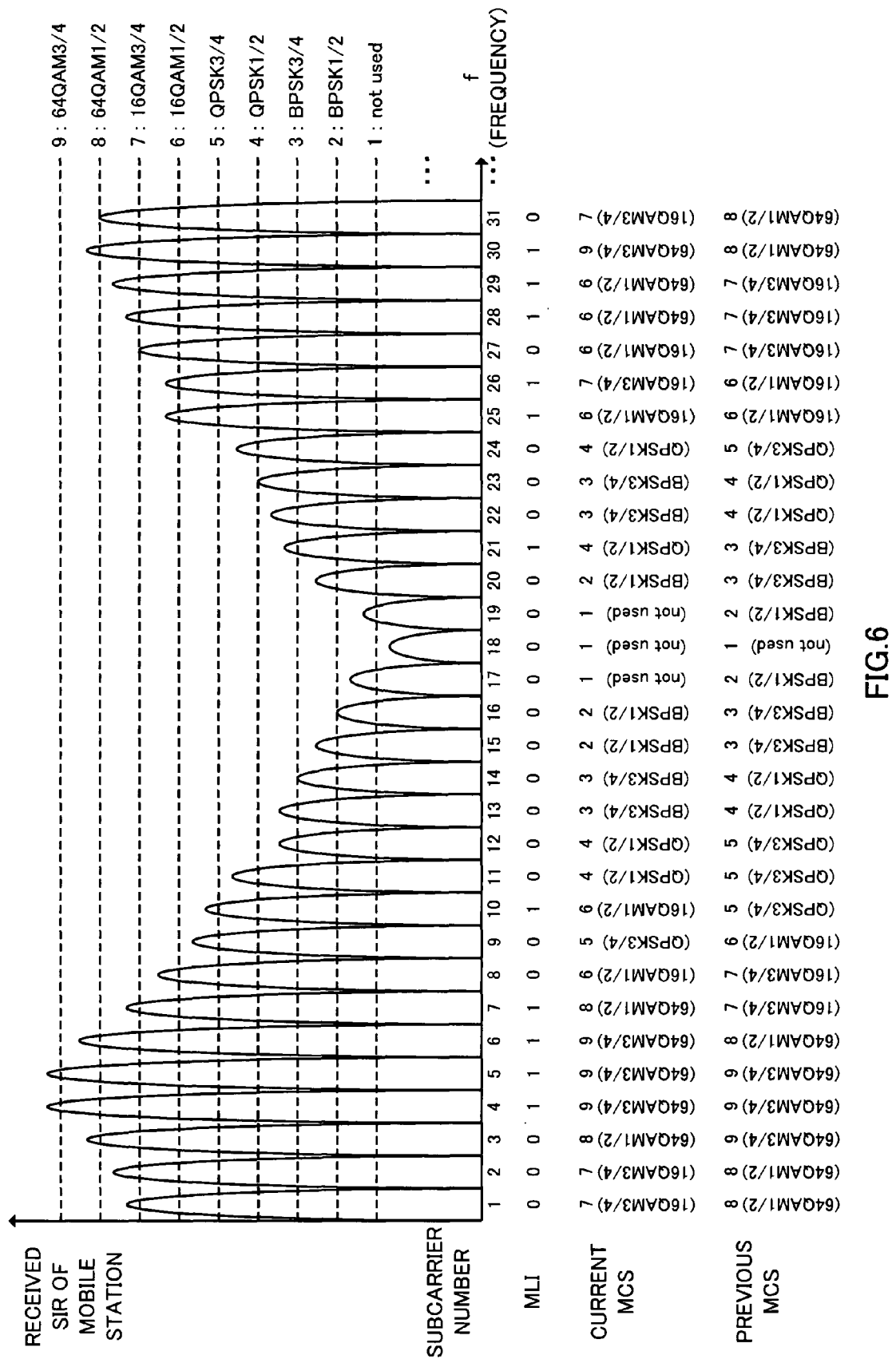
FIG. 6 is a diagram showing relationships among MLI, MCS, and received SIR generated by the base station according to the first embodiment.
Figure 7:
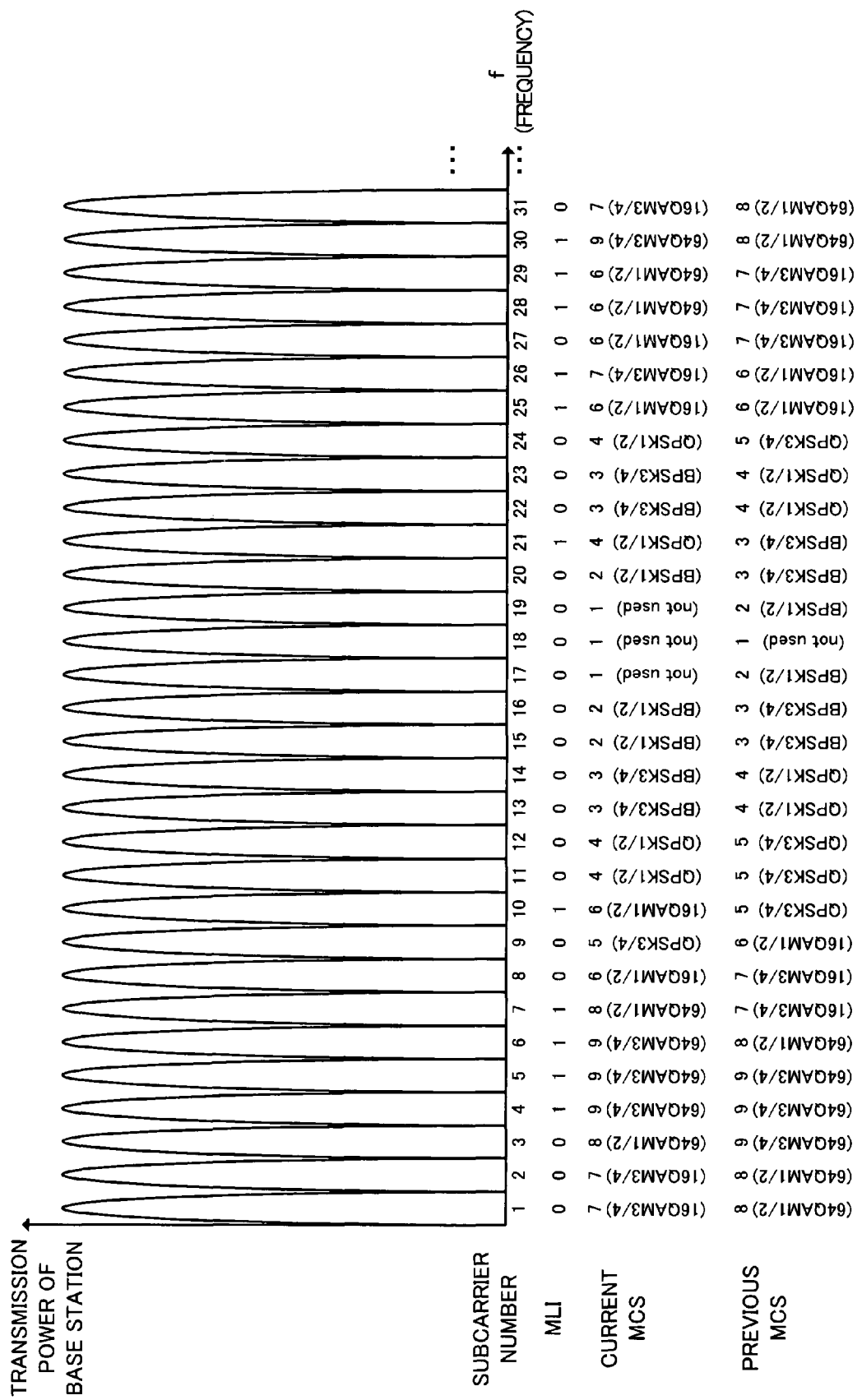
FIG. 7 is a diagram showing relationships among MLI, MCS, and transmission power generated by the base station according to the first embodiment.

A concrete description will be given below with reference to FIG. 6. Since the previous MCS level is eight (64QAM ½) and the received SIR is lower than the threshold of MCS8 in FIG. 6, the MCS level of subcarrier 1 is determined to be MCS7 by being lowered by one level, and zero is inserted into MLI. Since the previous MCS level of subcarrier 5 is nine (64QAM ¾), the received SIR is larger than the threshold of MCS9, and the MCS level is nine, the MCS level remains unchanged at nine and one is inserted into MLI. As a result, MLI, MCS, and transmission power of the base station are determined as shown in FIG. 7 and subcarriers are transmitted.

Figure 8:
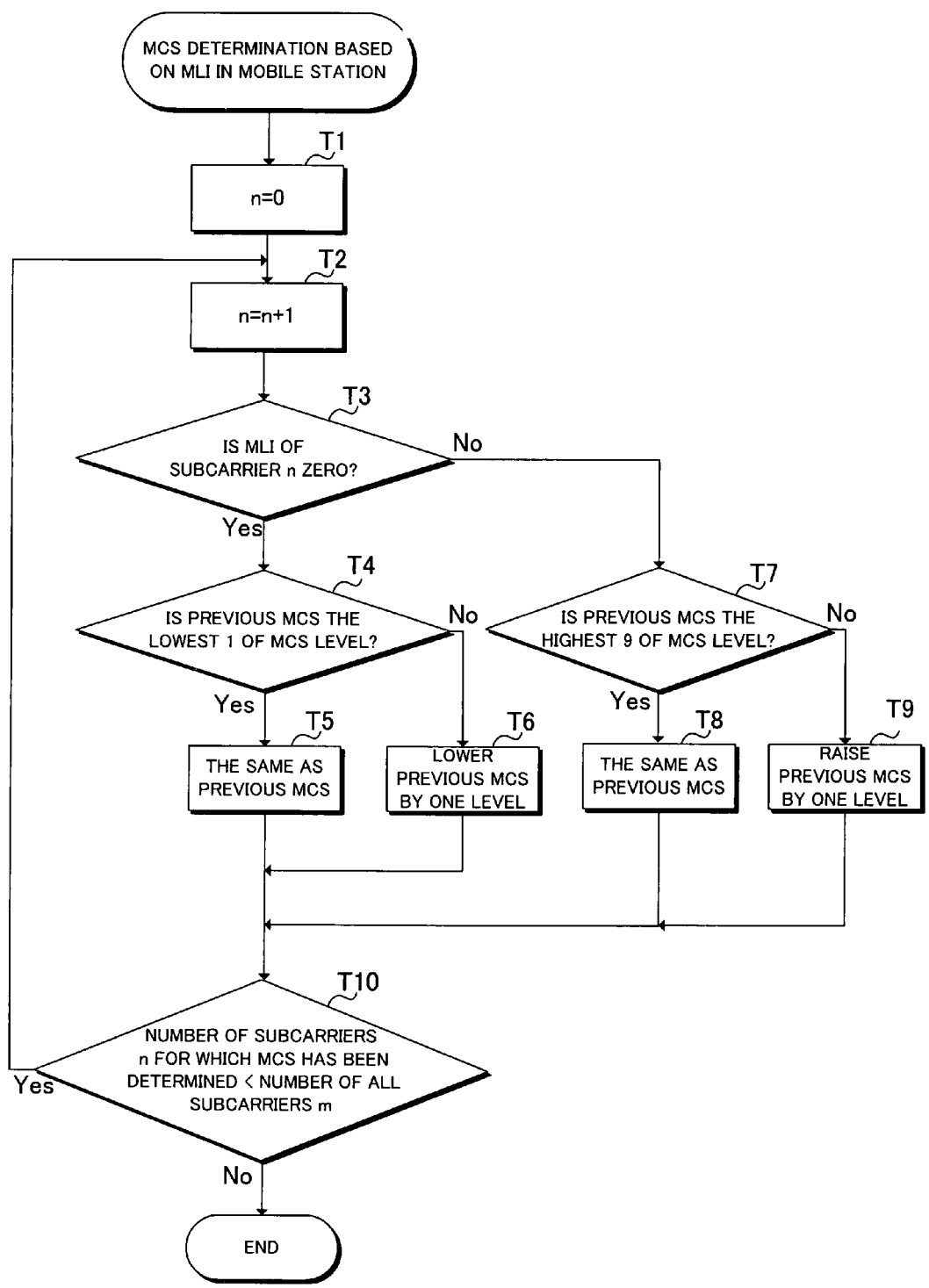
FIG. 8 is a flow chart showing operations of the mobile station according to the first embodiment.

FIG. 8 is a flow chart showing operations of the mobile station according to the first embodiment. First, the mobile station starts with the subcarrier number n set as n=0 (step T1) and adds one to n (step T2). The mobile station determines MLI of subcarrier 1 (step T3). If MLI is zero, the mobile station checks whether or not the previous MCS level is one (step T4) and, if the previous MCS level is one, control is performed to retain the previous MCS (the MCS level is 1) (step T5). If, on the other hand, the previous MCS level is other than one, control is performed to lower the MCS level by one level (step T6).

If, on the other hand, MLI is one in step T3, whether or not the previous MCS level is nine is checked (step T7). If the previous MCS level is nine, control is performed to retain the previous MCS (the MCS level is nine) (step T8). If, on the other hand, the previous MCS level is other than nine, control is performed to lower the MCS level by one level (step T9).

Next, whether or not MCS is determined for all subcarriers is checked (step T10). If there is any remaining subcarrier, the above determination method is repeatedly applied to each of remaining subcarriers, the MCS levels of all subcarriers are determined, and control is performed using the determined results.

According to the first embodiment, as described above, by representing difference information between the previous MCS level information and the current MCS level information by one bit for each subcarrier and determining the MCS level by analyzing modulation information on the mobile station side, modulation information for each subcarrier can be reduced, and then, modulation information of all subcarriers can be reduced. Moreover, since the MCS level is controlled by 1-bit difference information, the MCS level will change in stages by one level and therefore, stable communication can be performed.

Second Embodiment

In a second embodiment, difference information created with one bit means changing from the previous MCS level or not changing from the previous MCS level. For example, if the difference information is one, the MCS level is raised by one level. If, on the other hand, the difference information is zero, the MCS level remains unchanged. A base station compares a received SIR from a mobile station with a threshold of a previous MCS level and that of the MCS level one level above the previous MCS level. If the received SIR is smaller than the previous MCS level, the MCS level is lowered and, if the received SIR is larger than the threshold of the MCS level one level above the previous MCS level, the MCS level is raised. If the received SIR is between both thresholds, the MCS level is retained unchanged at the previous MCS level and difference information is transmitted. The mobile station, on the other hand, determines the MCS level based on the difference information, current received SIR, and a predetermined threshold.

A base station according to the second embodiment is configured just like the base station in the first embodiment shown in FIG. 1. A mobile station according to the second embodiment is configured like the mobile station in the first embodiment shown in FIG. 2, but there is a difference from the first embodiment in that the MCS storage part 39 stores a MCS threshold and delivers the previous MCS threshold to the MCS controller 38.

Figure 9:
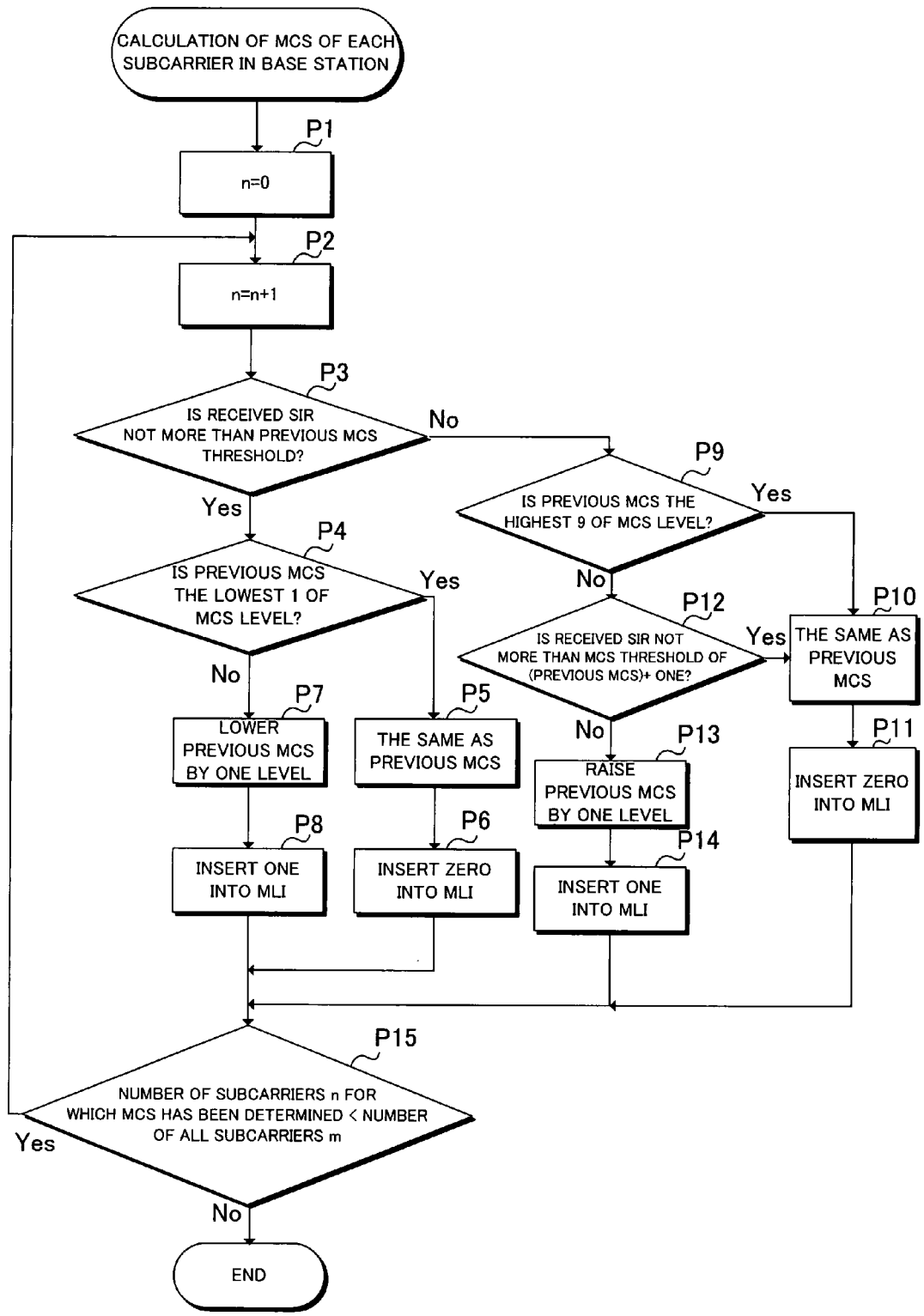
FIG. 9 is a flow chart showing operations of a base station according to a second embodiment.

Next, operations of the base station according to the second embodiment will be described with reference to a flow chart shown in FIG. 9. First, the base station starts with the subcarrier number n set as n=0 (step P1), adds one to n (step P2), and based on the received SIR estimated by the mobile station, the threshold of the previous MCS level of subcarrier 1 and the current received SIR value are compared (step P3).

If, as a result of comparison, the received SIR is smaller than the previous MCS threshold, whether or not the previous MCS level of subcarrier 1 is the lowest one of the MCS level is checked (step P4). If the previous MCS level is one, the MCS level is determined to be the same (the MCS level is one) as the previous MCS level (step P5), and zero is inserted into MLI (step P6). If, on the other hand, the previous MCS level is other than one in step P4, the MCS level is determined by lowering one level from the previous MCS level (step P7). Then, one is inserted into MLI (step P8).

Next, in step P3, if, as a result of comparing the threshold of the previous MCS level of subcarrier 1 and the current received SIR value, the received SIR is larger, whether or not the previous MCS level of subcarrier 1 is the highest 9 of the MCS level (step P9). If the previous MCS level is nine, the MCS level is determined to remain the same (the MCS level is nine) as the previous MCS level (step P10) and zero is inserted into MLI (step P11). If, on the other hand, the previous MCS level is other than nine in step P9, the threshold of the MCS level one level above the previous MCS level and the received SIR value is compared (step P12). If the received SIR is smaller, the MCS level is determined to be the same as the previous MCS level (step P10) and zero is inserted into MLI (step P11). If, on the other hand, the received SIR is larger in step P12, the MCS level is determined by raising the previous MCS level by one level (step P13) and one is inserted into MLI (step P14).

Next, whether or not MCS is determined for all subcarriers is checked (step P15). If there is any remaining subcarrier, the above determination method is repeatedly applied to each of remaining subcarriers to determine the MCS levels of all subcarriers and create MLI, and adaptive modulation is performed by controlling the modulation scheme and coding rate.

Figure 10:
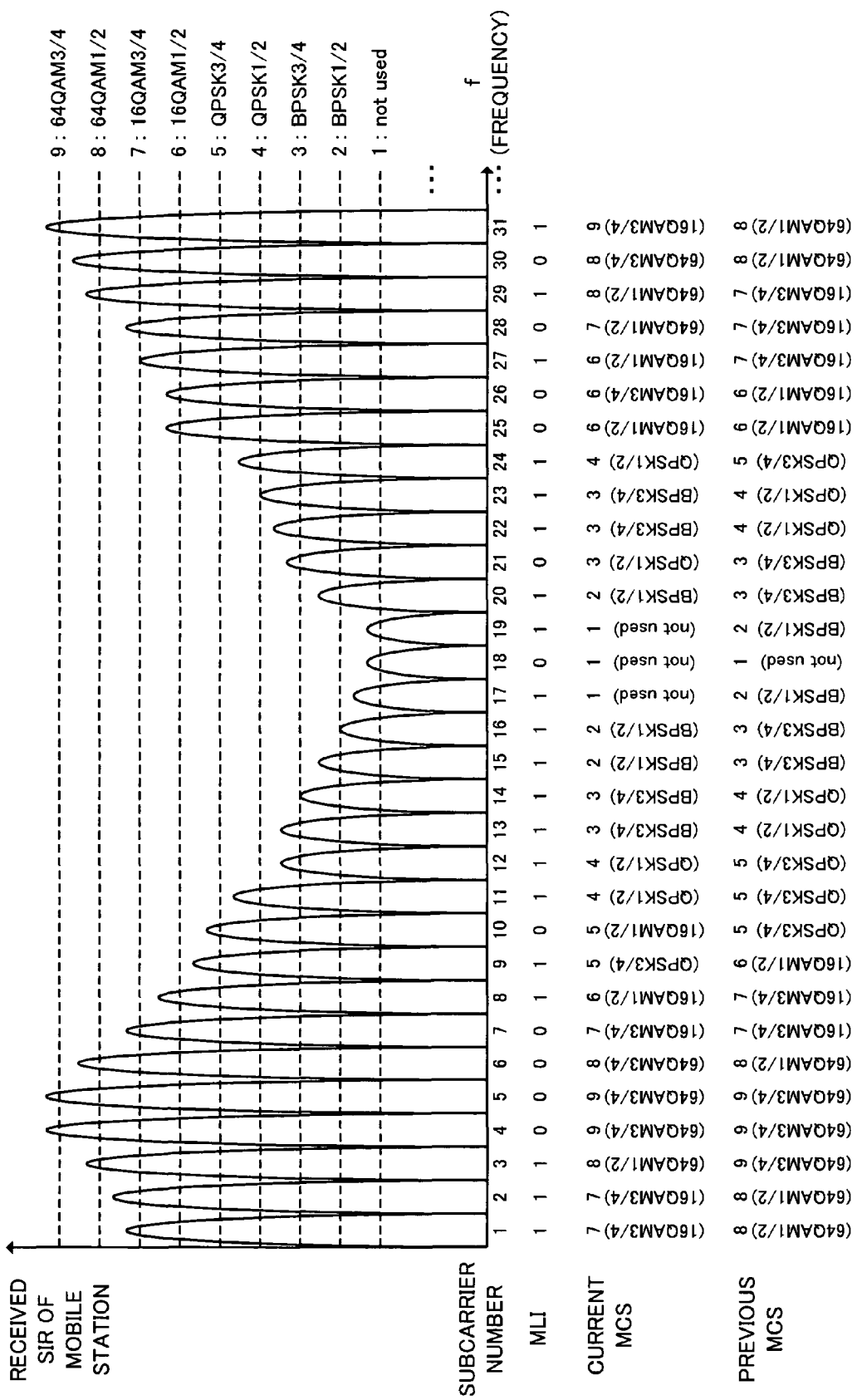
FIG. 10 is a diagram showing relationships among MLI, MCS, and received SIR generated by the base station according to the second embodiment.

A concrete description will be given below with reference to FIG. 10. Since the previous MCS level is eight (64QAM ½) and the received SIR is lower than the threshold of the MCS level 8, the MCS level of subcarrier 1 is determined to be MCS level 7 by lowering by one level, and the and MLI becomes one. Since the previous MCS level of subcarrier 5 is nine (64QAM ¾) and the received SIR is larger than the threshold of the MCS level 9, the MCS level remains unchanged at nine and MLI becomes zero. The previous MCS level of subcarrier 29 is seven (16QAM ¾), the received SIR is larger than the threshold of the MCS level 7, and further the received SIR is larger than the threshold of the MCS level 8 and therefore, the MCS level is determined to be eight by raising the MCS level by one level and MLI becomes one.

Figure 11:
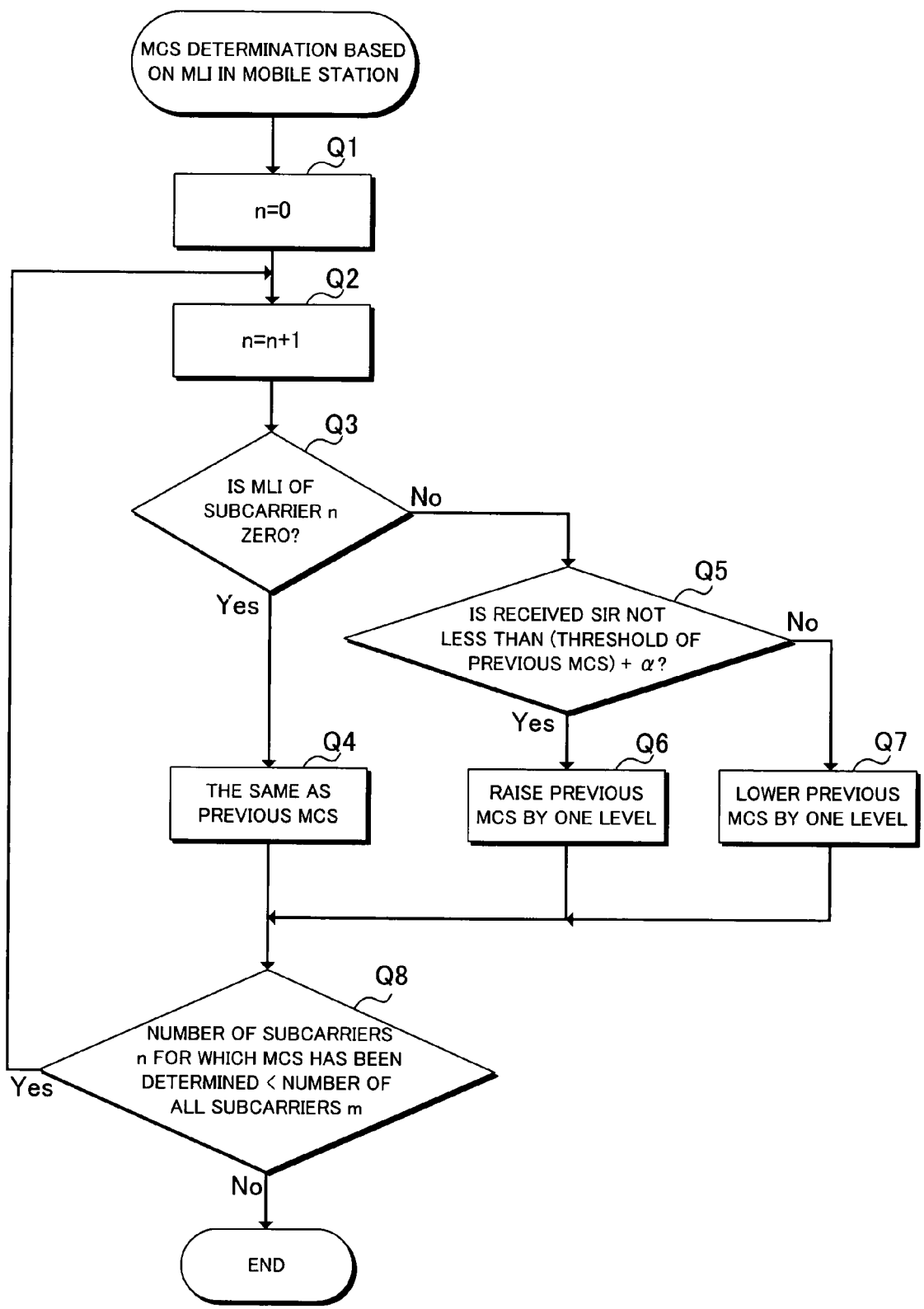
FIG. 11 is a flow chart showing operations of a mobile station according to the second embodiment.

Next, operations of the mobile station according to the second embodiment will be described with reference to a flow chart shown in FIG. 11. The mobile station compares SIR during reception and a threshold to determine MCS from MLI. As shown in FIG. 11, the mobile station first starts with the subcarrier number n set as n=0 (step Q1) and adds one to n (step Q2).

Here, in the second embodiment, since the threshold for determining the MCS level is different from the previous MCS when MLI is one, it is assumed that an assumed received SIR value will be not more than the threshold of the previous MCS level or larger than the threshold of the MCS level one level above the previous MCS level. In other words, according to the algorithm for determining MCS on the base station side, MLI is set to one when the received SIR value is not more than the threshold of the previous MCS level or larger than the threshold of the MCS level one level above the previous MCS level. Then, in consideration of transmission path errors, a mean value between the threshold of the previous MCS level and that of the MCS level one level above the previous MCS level is used as a determination threshold. The mobile station determines MLI of subcarrier 1 (step Q3) and, if MLI is 0, performs control determining that the MCS level should be the same as the previous MCS level (step Q4).

If, on the other hand, in step Q3, MLI is one, the received SIR value and ((threshold of the previous MCS level)+((threshold of the MCS level one level above the previous MCS level)−(threshold of the previous MCS level))/2) of the threshold are compared (step Q5). If the threshold is larger than the received SIR value, control is performed determining that MCS should be raised by one level (step Q6). If the threshold is smaller than the received SIR value, control is performed determining that MCS should be lowered by one level (step Q7).

Next, whether or not MCS is determined for all subcarriers is checked (step Q8). If there is any remaining subcarrier, the above determination method is repeatedly applied to each of remaining subcarriers until the MCS levels of all subcarriers are determined.

Figure 12:
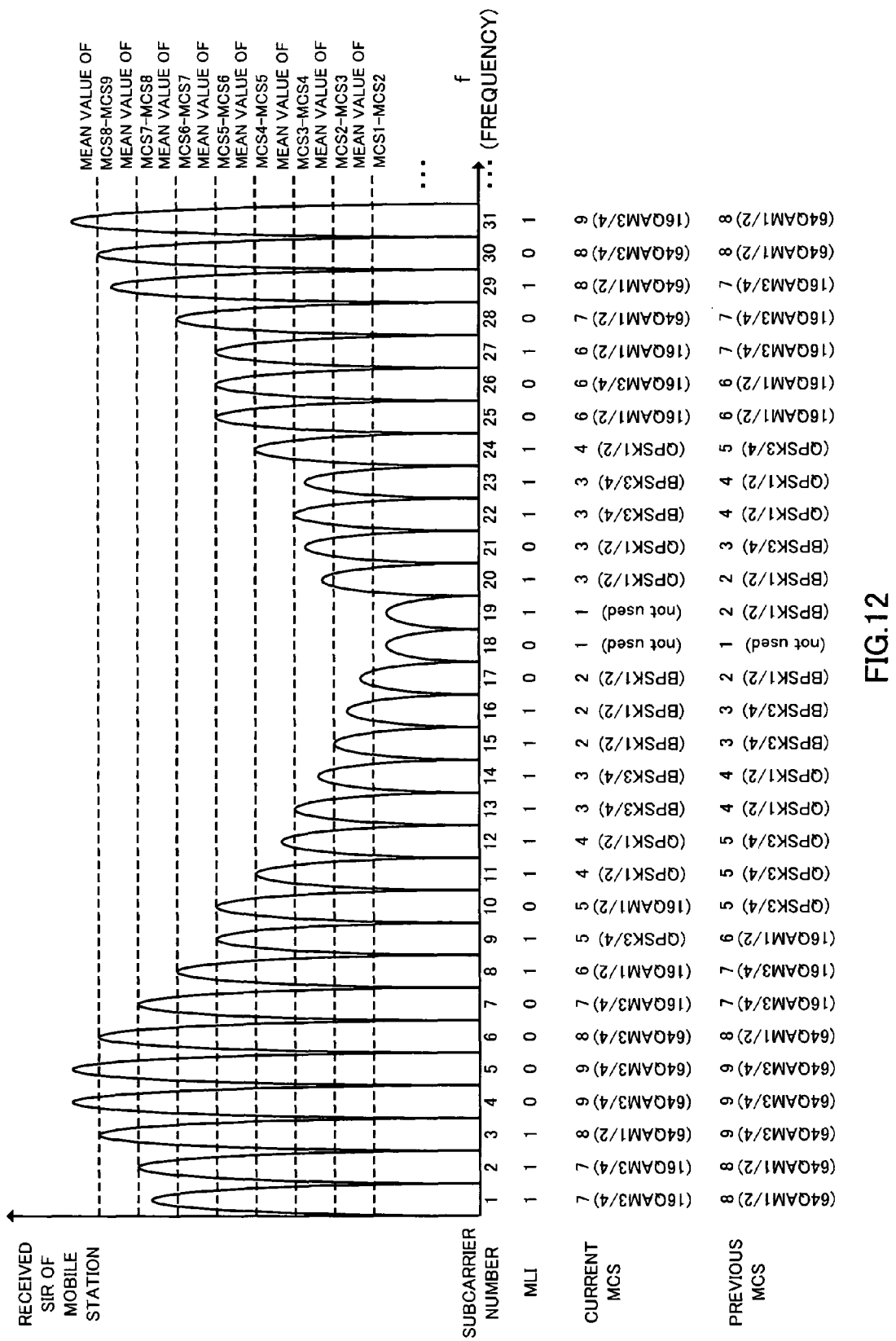
FIG. 12 is a flow chart showing an operation to determine MCS from MLI and received SIR in the mobile station according to the second embodiment.

A concrete description will be given below with reference to FIG. 12. Since MLI of subcarrier 1 is one, the previous MCS level is eight (64QAM ½), and, if the determination threshold is a mean value between the threshold 8 of the previous MCS level and threshold 9 of the MCS level one level above the previous MCS level, the previous MCS level is lower than the mean value, the MCS level is lowered by one level to the MCS level 7. MLI of subcarrier 5 is zero and thus, the MCS level remains the same as the previous MCS level 9. Since MLI of subcarrier 29 is one, the previous MCS level is seven (16QAM ¾), and, if the determination threshold is a mean value between the threshold 7 of the previous MCS level and the threshold 8 of the MCS level one level above the previous MCS level, the previous MCS level is larger than the mean value, the MCS level is raised by one level to the MCS level 8.

Third Embodiment

In a third embodiment, like the second embodiment, difference information generated with one bit means changing from the previous MCS level or not changing from the previous MCS level. For example, if the difference information is one, the MCS level is raised by one level. If, on the other hand, the difference information is zero, the MCS level remains unchanged. A base station compares a received SIR from a mobile station with a threshold of a previous MCS level and that of the MCS level one level above the previous MCS level. If the received SIR is smaller than the previous MCS level, the MCS level is lowered and, if the received SIR is larger than the threshold of the MCS level one level above the previous MCS level, the MCS level is raised. If the received SIR is between both thresholds, the MCS level is retained unchanged at the previous MCS level and difference information is transmitted. The mobile station, on the other hand, determines the MCS level based on the difference information, current received SIR, and previous received SIR.

A base station according to the third embodiment adopts the same configuration as that of the base station according to the second embodiment and performs the same operations as those of the base station according to the second embodiment.

Figure 13:
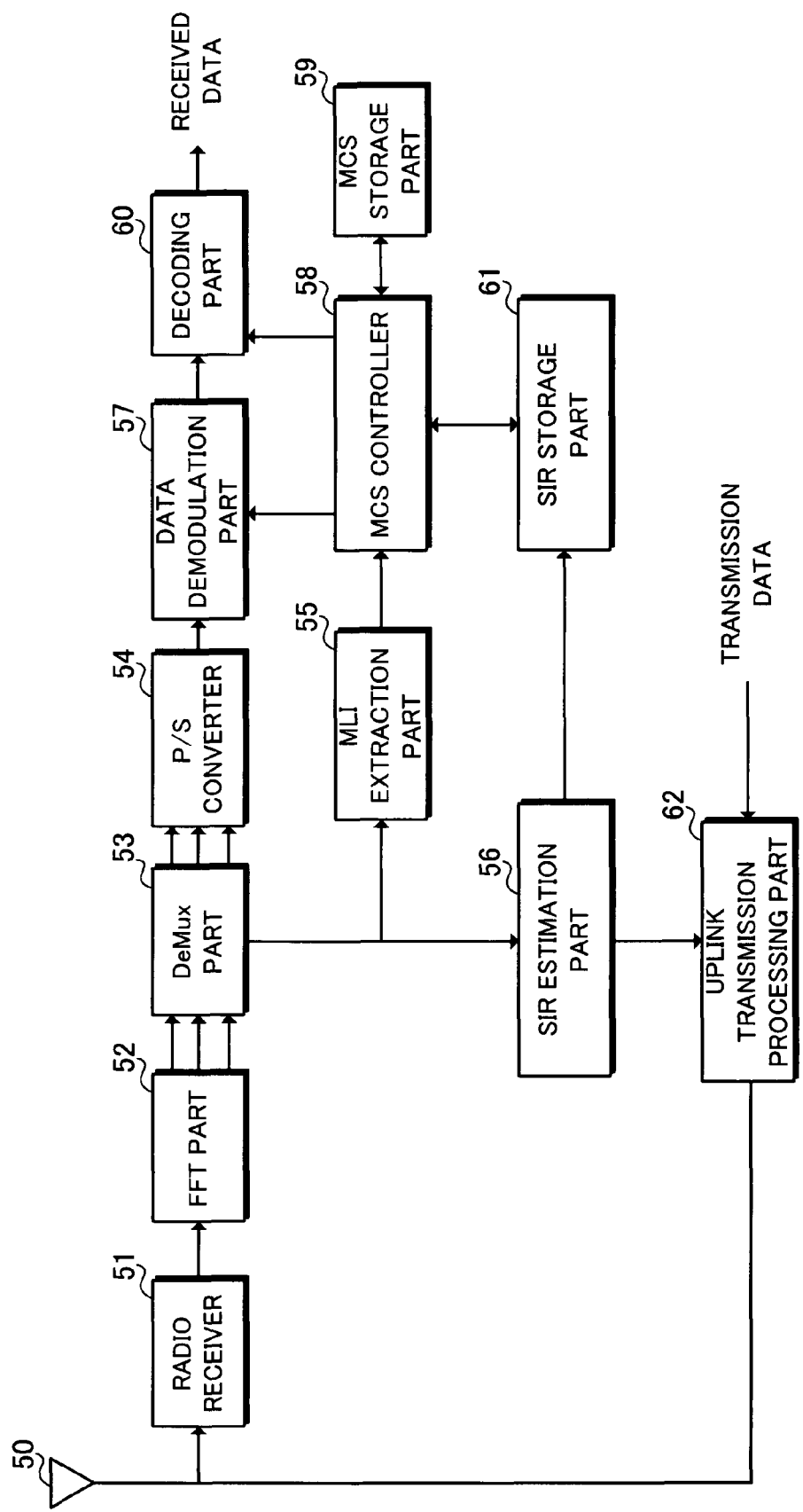
FIG. 13 is a block diagram showing a schematic configuration of a mobile station according to a third embodiment.

FIG. 13 is a block diagram showing the schematic configuration of a mobile station according to the third embodiment. The mobile station compares a received SIR in a previous frame and that in a current frame to determine MCS. A radio signal from the base station is received by an antenna 50 and a radio receiver 51, and the radio signal in the radio frequency band is down-converted into an IF frequency band to be forwarded to a fast Fourier transform part (FFT part) 52. The FFT part 52 performs Fourier transform to convert an OFDM signal back into modulated data. A DeMux part 53 demultiplexes multiplexed modulated data to forward the modulated data, MLI, and a pilot signal to a parallel-serial converter (P/S converter) 54, an MLI extraction part 55, and an SIR estimation part, respectively. In the parallel-serial converter (P/S converter) 54, the modulated data, which has been parallel-processed according to the number of subcarriers, is parallel-serial converted back into serial modulated data. In a data demodulation part 57, the modulated data is demodulated by an instructed demodulation method following instructions of an MCS controller 58 back into encoded data. An MCS storage part 59 stores MCS information and delivers the previous MCS information to the MCS controller 58.

In a decoding part 60, the encoded data is decoded by an instructed method following instructions of the MCS controller 58 back into original data. In the MLI extraction part 55, demodulation and decoding processing to convert back modulation and coding processing performed on MLI in the base station to forward MLI data to the MCS controller 58. In the MCS controller 58, MCS is determined based on the MLI data, previous received SIR of each subcarrier, and current received SIR. The MCS controller 58 also controls the data demodulation part 57 and decoding part 60. The SIR estimation part 56 estimates a received SIR based on a pilot signal and delivers an SIR estimation result to an SIR storage part 61 and an uplink transmission processing part 62. The SIR storage part 61 forwards the current received SIR and previous received SIR to the MCS controller 58. The SIR storage part 61 constitutes an estimation result storage part. In the uplink transmission processing part 62, transmission data and the current received SIR estimation result are multiplexed and converted into a radio signal to be transmitted to the base station.

Incidentally, adaptive modulation control may not be used for communication control of an uplink on the base station receiving side and the mobile station transmitting side.

Figure 14:
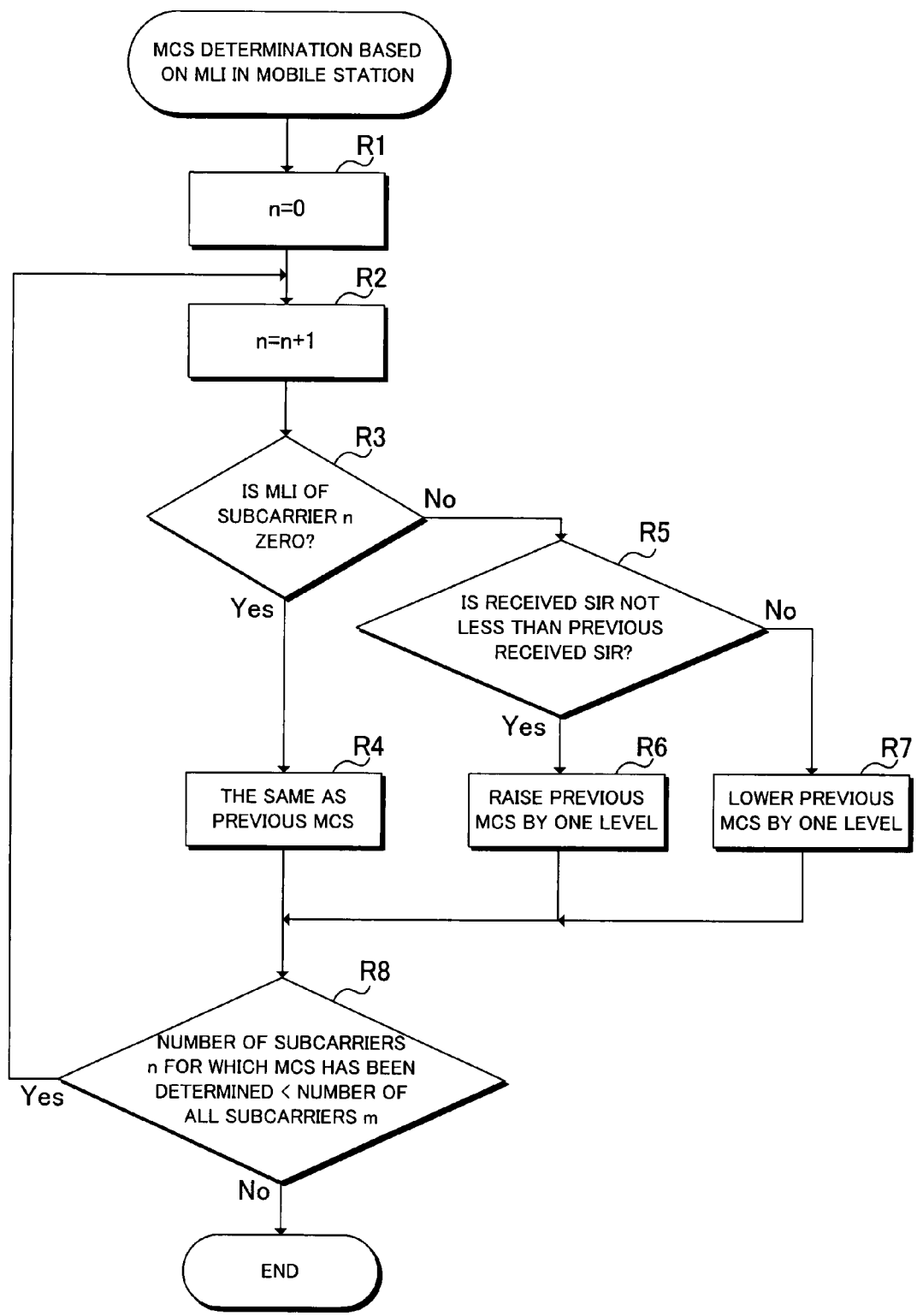
FIG. 14 is a flow chart showing operations of the mobile station according to the third embodiment.

Next, operations of the mobile station according to the third embodiment will be described with reference to a flow chart shown in FIG. 14. The mobile station compares the current received SIR and previous received SIR to determine MCS from MLI, when determining MCS from MLI. As shown in FIG. 14, the mobile station first starts with the subcarrier number n set as n=0 (step R1) and adds one to n (step R2). Next, the mobile station determines MLI of subcarrier 1 (step R3) and, if MLI is 0, performs control determining that the MCS level should be the same as the previous MCS level (step R4).

If, on the other hand, MLI is one in step R3, the current received SIR value and the stored previous received SIR value are compared (step R5) and, if the current received SIR value is larger, control is performed determining that the MCS level should be raised by one level (step R6). If, on the other hand, the current received SIR value is smaller in step R5, control is performed determining that the MCS level should be lowered by one level (step R7).

Next, whether or not MCS is determined for all subcarriers is checked (step R8). If there is any remaining subcarrier, the above determination method is repeatedly applied to each of remaining subcarriers until the MCS levels of all subcarriers are determined.

Figure 15:
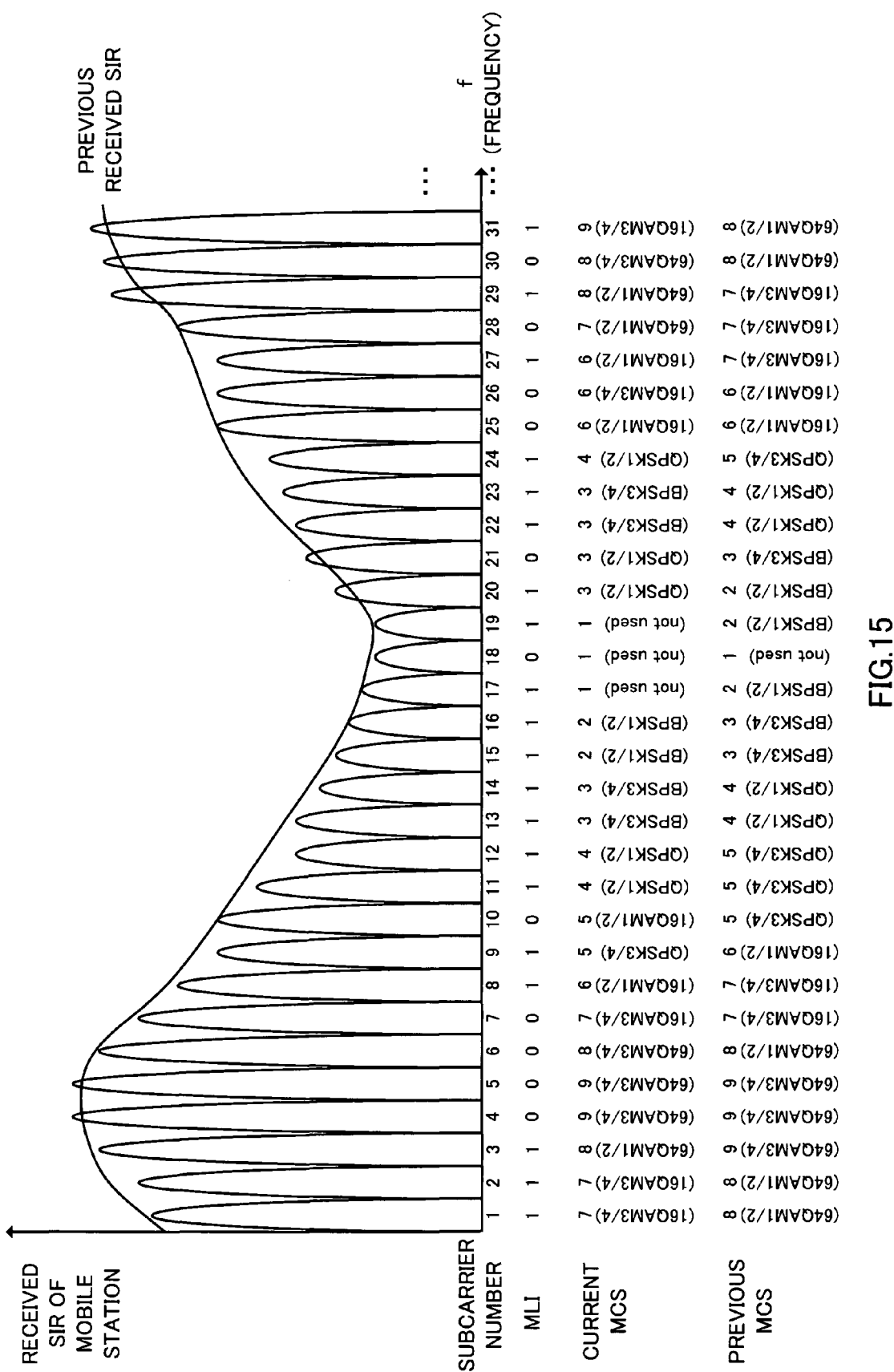
FIG. 15 is a diagram showing relationships among MLI, MCS, and received SIR when determining MCS in the mobile station according to the third embodiment.

A concrete description will be given below with reference to FIG. 15. Since MLI of subcarrier 1 is one, the previous MCS level is eight (64QAM ½), and the received SIR is lower than the previous received SIR, the MCS level is lowered by one level to the MCS level 7. MLI of subcarrier 5 is zero and thus, the MCS level remains the same as the previous MCS level 9. Since MLI of subcarrier 29 is one, the previous MCS level is seven (16QAM ¾), and the received SIR is larger than the previous received SIR, the MCS level is raised by one level to the MCS level 8.

Fourth Embodiment

In a fourth embodiment, a base station compares a propagation path condition estimation result with a predetermined threshold to select one of difference information generated with one bit and information directly indicating a modulation parameter as modulation information to notify a receiving side of a modulation parameter used for performing adaptive modulation of a subcarrier or the subcarrier group.

Figure 16:
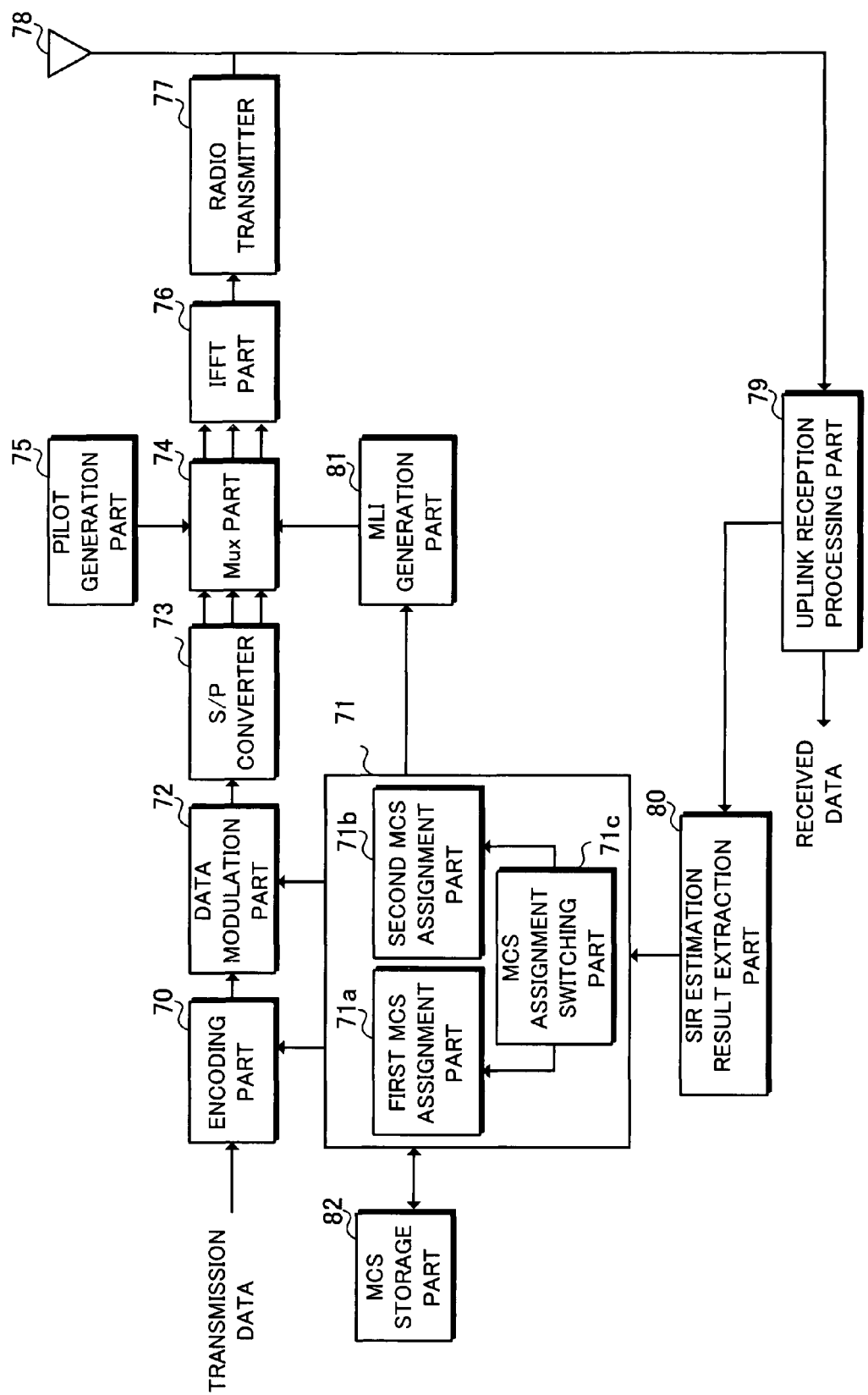
FIG. 16 is a block diagram showing a schematic configuration of a base station according to a fourth embodiment.

FIG. 16 is a block diagram showing the schematic configuration of a base station according to the fourth embodiment. Transmission data is input into an encoding part 70 to encode data at a coding rate instructed by an MCS determination part 71 using a coding method such as turbo coding. The encoded data is modulated by a data modulation part 72 by a modulation method instructed by the MCS determination part 71. Here, the modulation scheme and coding rate instructed by a first MCS assignment part 71a or a second MCS assignment part 71b are instructed in combinations of the modulation scheme and coding rate shown in FIG. 21. There can be any number of combinations of the modulation scheme and coding rate.

Modulated data from the data modulation part 72 is converted into parallel data according to the number of subcarriers by a serial-parallel converter (S/P converter) 73. The parallel-converted modulated data according to the number of subcarriers is input into a multiplexing part (Mux part) 74 to be multiplexed with the pilot signal input by a pilot generation part 75 to enable the mobile station to estimate a received SIR and modulation and code scheme information (MLI: Multilevel Information) in which MCS control system information describing a determination method of MCS and the modulation scheme and coding rate of each subcarrier are written, and inverse-Fourier transformed by an inverse fast Fourier transform part (IFFT part) 76 into an OFDM signal, and forwarded to a radio transmitter 77. The radio transmitter 77 up-converts the OFDM signal into a radio frequency band to transmit the signal to the mobile station via an antenna 78 while maintaining transmission power of each subcarrier constant.

In an uplink reception processing part 79, data from the mobile station is received and the received data and an SIR estimation result estimated by the mobile station are demultiplexed, and then the SIR estimation result is forwarded to an SIR estimation result extraction part 80. A reception mode of a demodulation part of the base station needs not necessarily be equipped with capability of adaptive modulation reception. The SIR estimation result extraction part 80 performs demodulation processing of modulation processing or the like performed on an SIR estimation result to forward the SIR estimation result to the MCS assignment part.

The MCS determination part 71 consists of the first MCS assignment part 71a determining MCS by the control method shown in the first to third embodiments, the second MCS assignment part 71b determining MCS by a conventional method, and an MCS assignment switching part 71c determining the MCS assignment control method based on the received SIR of the mobile station. The MCS assignment switching part 71c calculates an average SIR of all subcarriers from the SIR estimation result and compares the average SIR with a previous average SIR of all subcarriers to determine the MCS assignment control method. Based on a result of the MCS assignment switching part 71c, the first MCS assignment part 71a or second MCS assignment part 71b determines MCS of each subcarrier from the SIR estimation result and instructs the coding rate and modulation method to the encoding part 70 and data modulation part 72.

In the case of the first MCS assignment part 71a, difference information between the previous MCS of each subcarrier and current MCS of each subcarrier is delivered to an MLI generation part 81. In the case of the second MCS assignment part 71b, digitized MCS of each subcarrier is delivered to the MLI generation part 81 as MCS information. An MCS storage part 82 delivers the previous MCS information to the first MCS assignment part 71a when determining MCS and also stores determined MCS information. The MLI generation part 81 assembles MCS information of each subcarrier, performs modulation and coding using a modulation scheme and coding rate so that the mobile station can receive in any environment, and then delivers the generated MLI to the Mux part 74.

The above first MCS assignment part 71a constitutes a difference information output part and the MCS assignment switching part 71c constitutes a selection part.

The modulation scheme and coding rate used by the MLI generation part 81 are fixed by being determined in advance between the base station and mobile station and MLI must be receivable in whatever environment the mobile station is located and thus, MLI with a modulation level as low as possible (such as BPSK and QPSK) and a low coding rate is desirable.

Figure 17:
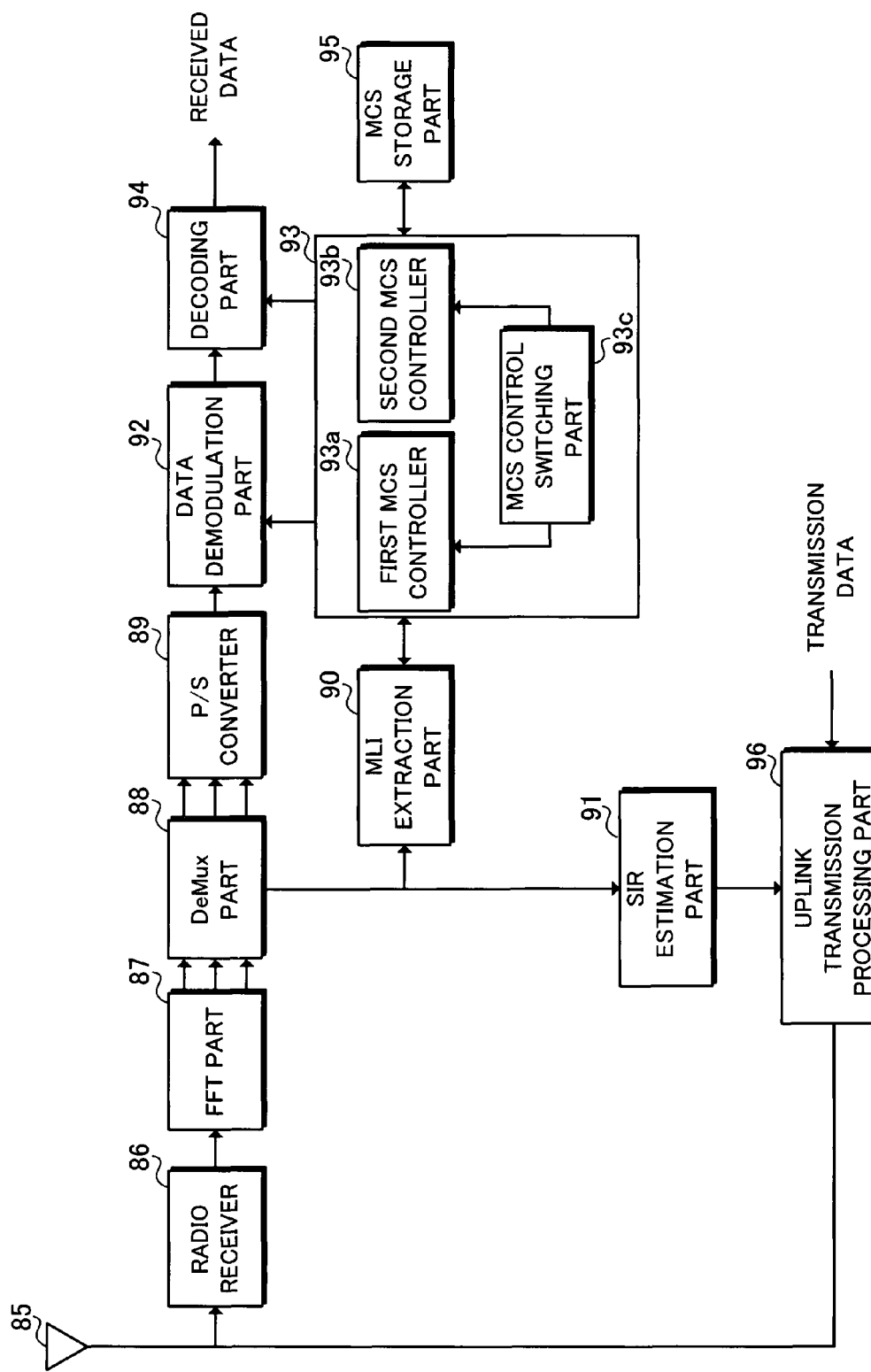
FIG. 17 is a block diagram showing a schematic configuration of a mobile station according to the fourth embodiment.

FIG. 17 is a block diagram showing the schematic configuration of a mobile station according to the fourth embodiment. A radio signal from the base station is received by an antenna 85 and a radio receiver 86, and the radio signal in the radio frequency band is down-converted into an IF frequency band to be forwarded to a fast Fourier transform part (FFT part) 87. The FFT part 87 performs Fourier transform to convert an OFDM signal back into modulated data. A DeMux part 88 demultiplexes multiplexed modulated data to forward the modulated data to a parallel-serial converter (P/S converter) 89, MCS control system information and MLI to an MLI extraction part 90, and a pilot signal to an SIR estimation part 91.

In the parallel-serial converter (P/S converter) 89, the modulated data, which has been parallel-processed according to the number of subcarriers, is parallel-serial converted back into a serial modulated data. In a data demodulation part 92, the modulated data is demodulated by an instructed demodulation method following instructions of a first MCS controller 93a or a second MCS controller 93b back into encoded data. In a decoding part 94, the encoded data is decoded by an instructed method following instructions of the first MCS controller 93a or second MCS controller 93b back into original data. In the MLI extraction part 90, demodulation and decoding processing to convert back modulation and coding processing is performed on MCS control system information and MLI in the base station to forward the MCS control system information and MLI data to an MCS determination part 93.

The MCS determination part 93 consists of the first MCS controller 93a determining MCS by the control method shown in the first to third embodiments, the second MCS controller 93b determining MCS by a conventional method, and an MCS control switching part 93c switching MCS control based on MCS control system information. If the MCS control system information is one, the first MCS controller 93a is switched to by the MCS control switching part 93c and, if the MCS control system information is zero, the second MCS controller 93b is switched to. The first MCS controller 93a determines MCS for each bit from MLI information to perform demodulation or decoding. The second MCS controller 93b determines MCS for each several bits from MLI information to perform demodulation or decoding. An MCS storage part 95 stores MCS information and delivers the previous MCS information to the first MCS controller 93a.

The above first MCS controller 93a constitutes a difference information output part and the MCS control switching part 93c constitutes a selection part.

The SIR estimation part 91 estimates a received SIR based on a pilot signal and delivers an SIR estimation result to an uplink transmission processing part 96. In the uplink transmission processing part 96, transmission data and the SIR estimation result are multiplexed and converted into a radio signal to be transmitted to the base station.

Incidentally, adaptive modulation control may not be used for communication control of an uplink on the base station receiving side and the mobile station transmitting side.

Figure 18:
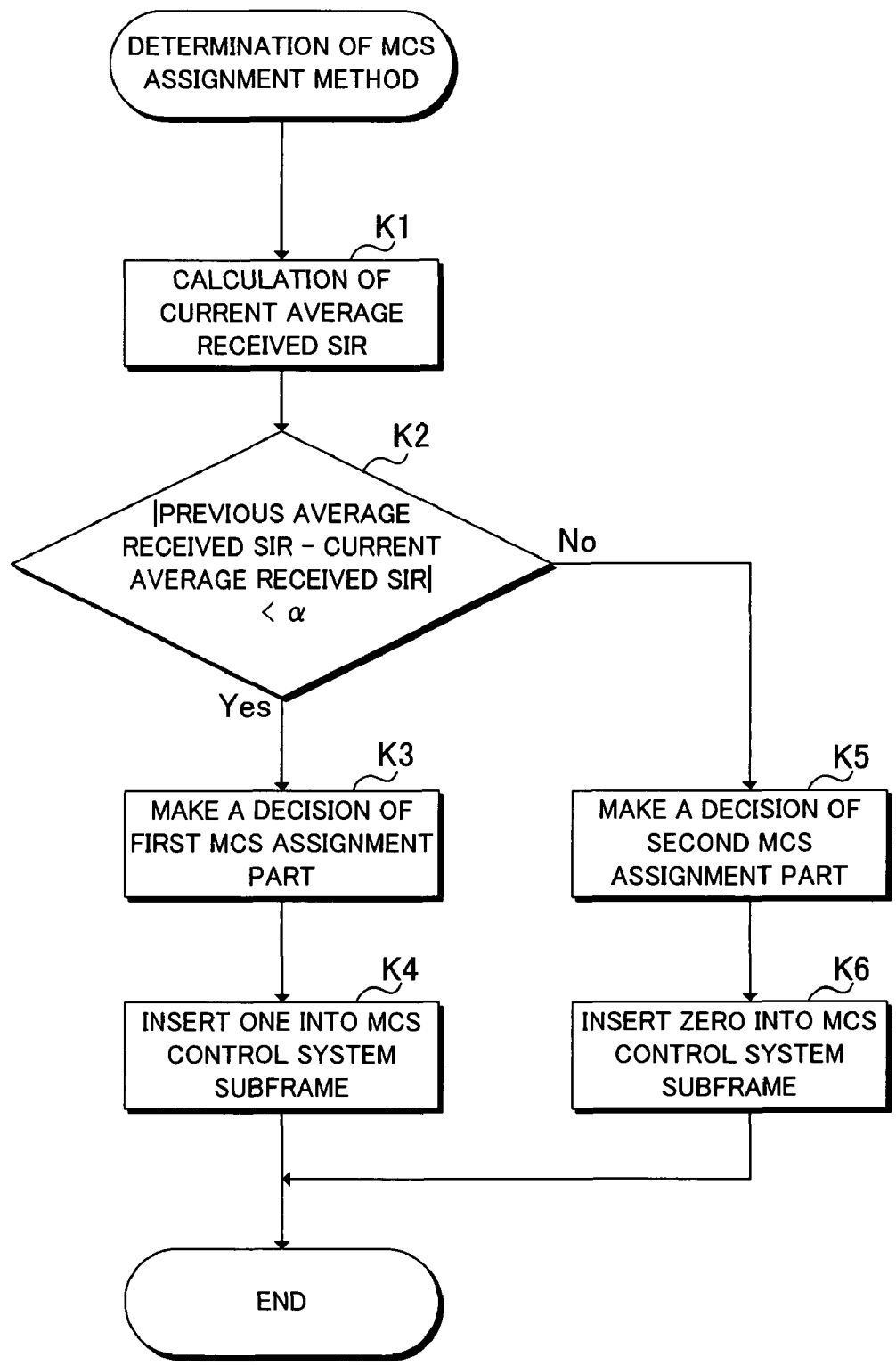
FIG. 18 is a flow chart showing an operation to determine an MCS assignment method of an MCS assignment switching part of a base station apparatus according to the fourth embodiment.

Next, an algorithm for determining an MCS assignment method of the MCS assignment switching part of the base station apparatus according to the fourth embodiment will be described with reference to FIG. 18. First, the MCS assignment switching part calculates the current average SIR from an SIR estimation result of all subcarriers (step K1). Next, whether or not an error between the current average SIR and previous average SIR is larger or smaller than an α value (step K2). If the error between the current average SIR and previous average SIR is less than the a value, the first MCS assignment part 71a (See FIG. 16) that adopts the control method shown in the above first to third embodiments is determined (step K3) assuming that radio propagation paths vary only slightly and one is inserted into an MCS control system switching subframe (step K4). If, on the other hand, the error between the current average SIR and previous average SIR is not less than the α value in step K2, the second MCS assignment part 71b (See FIG. 16) that adopts a conventional control method is determined (step K5) assuming that radio propagation paths vary significantly and zero is inserted into the MCS control system switching subframe (step K6).

Figure 19:
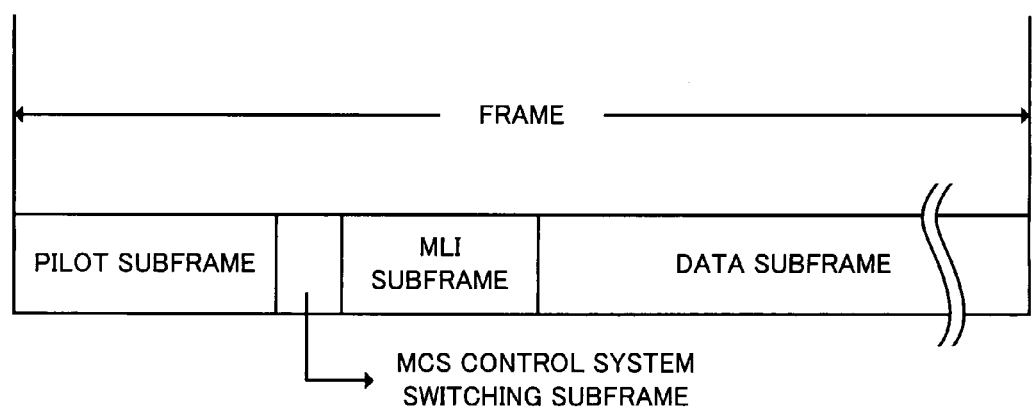
FIG. 19 is a diagram showing a frame structure in the fourth embodiment.
Figure 20:
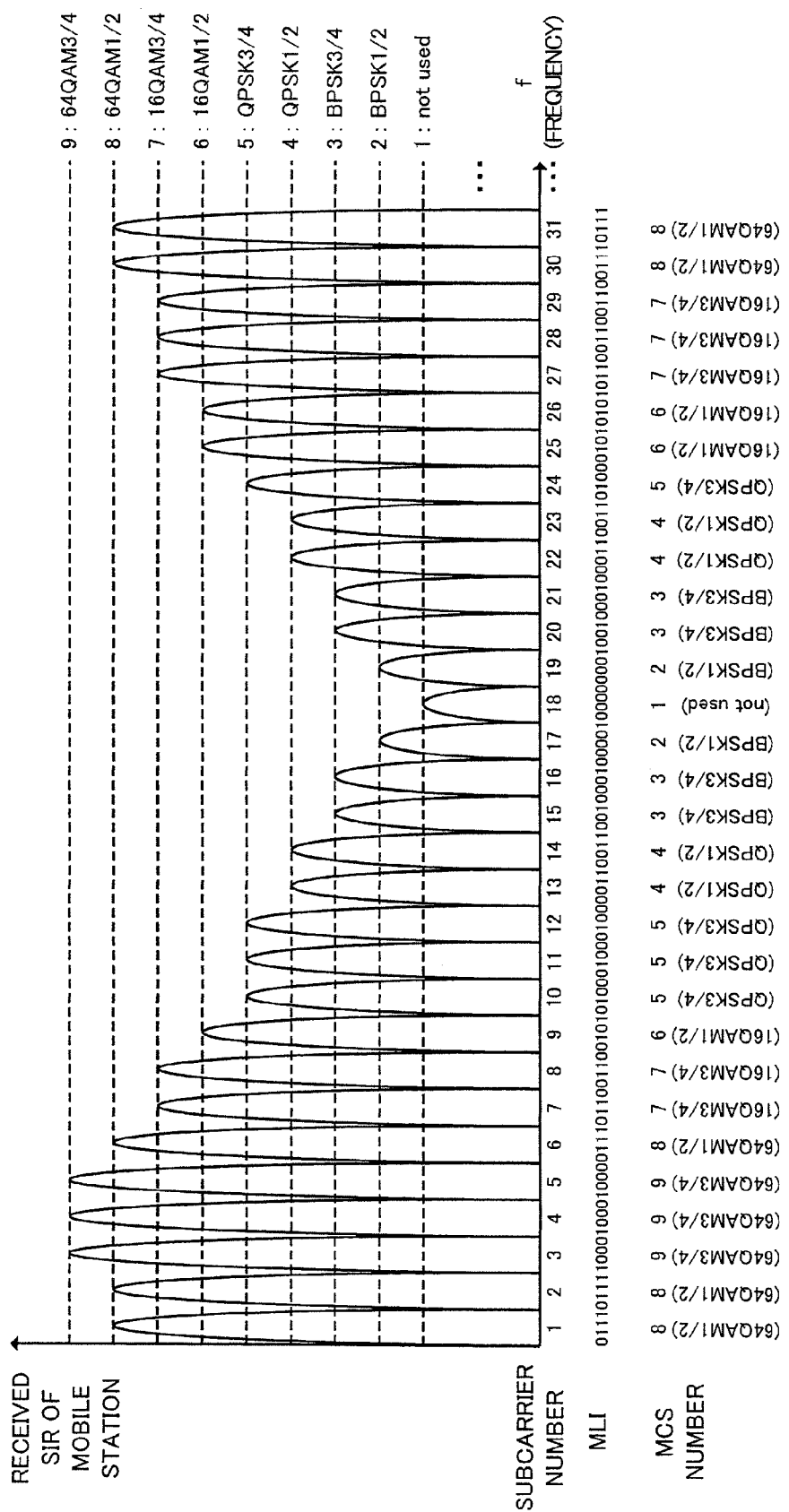
FIG. 20 is a diagram showing a conventional modulation information configuration.
Figure 23:
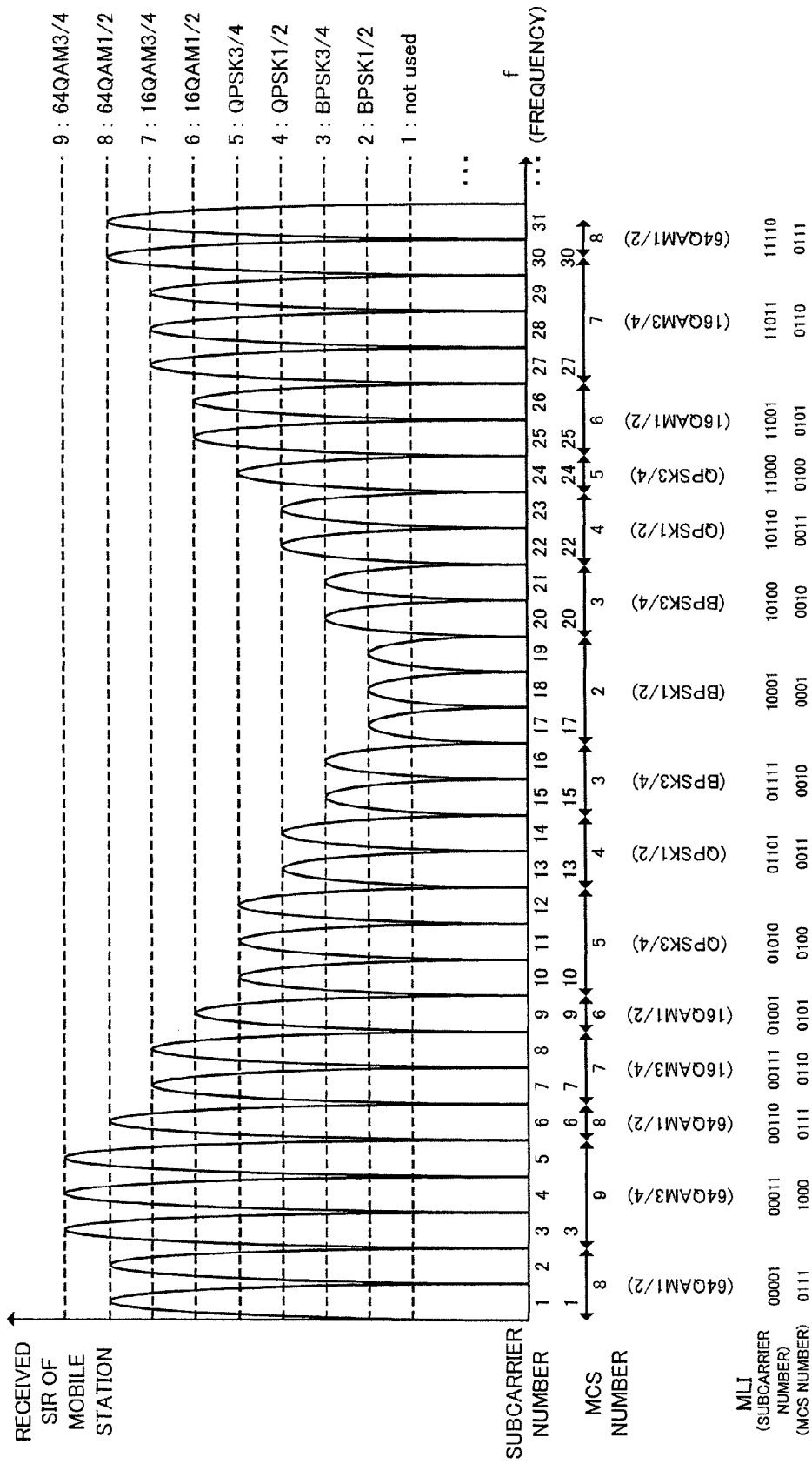
FIG. 23 is a diagram showing relationships between conventional MCS and MLI.

FIG. 19 is a diagram showing a frame structure in the fourth embodiment. An MCS control system switching subframe is inserted into the frame. The receiving side can thereby be notified how MCS is made known. If, in the above example, the MCS control system switching subframe contains one, the MLI subframe is constituted by the control method in the above first to third embodiments. In this case, difference information generated with one bit is contained in the MLI subframe. If, on the other hand, the MCS control system switching subframe contains zero, a conventional control method is adopted. In this case, information notifying a modulation parameter of each subcarrier is contained in the MLI subframe.

The above embodiments have described a configuration system of each subcarrier, but can also be used in an adaptive modulation communication system in which adaptive modulation is performed in units of blocks (in units of subcarrier groups) in which a plurality of subcarriers is put together. Moreover, the MCS level is determined based on a received SIR in the above embodiments, the MCS level may also be determined based on a received SNR (Signal to Noise Power Ratio) or SINR (Signal to Interference Plus Noise Power Ratio).

According to the embodiments as described above, modulation information can be reduced and an increase in effective throughput can be anticipated by representing difference information between previous MCS level information and current MCS level information with one bit for each subcarrier and determining the MCS level on the mobile station side through analysis of modulation information. Moreover, even if a received SIR of a mobile station varies rapidly due to dramatic variations of frequency fading, the MCS level varies in stages and operates ordinarily and therefore, dramatic variations can also be dealt with.

EXPLANATION OF REFERENCED NUMERALS AND SYMBOLS

10. Encoding part
11. MCS assignment part
12. Data modulation part
13. S/P converter
14. Mux part
15. Pilot generation part
17. Radio transmitter
18. Antenna
19. Uplink reception processing part
20. SIR estimation result extraction part
21. MLI generation part
22. MCS storage part
30. Antenna
31. Radio receiver
32. FFT part
33. DeMux part
34. P/S converter
35. MLI extraction part
36. SIR estimation part
37. Data demodulation part
38. MCS controller
39. MCS storage part
40. Decoding part
41. Uplink transmission processing part
50. Antenna
51. Radio receiver
52. FFT part
53. DeMux part
54. P/S converter
55. MLI extraction part
56. SIR estimation part
57. Data demodulation part
58. MCS controller
59. MCS storage part
60. Decoding part
61. SIR storage part
62. Uplink transmission processing part
70. Encoding part
71. MCS determination part
71a. First MCS assignment part
71b. Second MCS assignment part
71c. MCS assignment switching part 72. Data modulation part
73. S/P converter
74. Mux part
75. Pilot generation part
77. Radio transmitter
78. Antenna
79. Uplink reception processing part
80. SIR estimation result extraction part
81. MLI generation part
82. MCS storage part
85. Antenna
86. Radio receiver
87. FFT part
88. DeMux part
89. P/S converter
90. MLI extraction part
91. SIR estimation part
92. Data demodulation part
93a. First MCS controller
93b. Second MCS controller
93c. MCS control switching part
94. Decoding part
95. MCS storage part
96. Uplink transmission processing part

The invention claimed is:

1. A wireless transmitter that adaptively determines one modulation parameter from among a plurality of modulation parameters with different adaptive modulation levels based on an estimation result of propagation path conditions and performs adaptive modulation using said determined modulation parameter for each subcarrier or each subcarrier group consisting of a plurality of subcarriers, said wireless transmitter comprising:
   a storage part storing information indicating the adaptive modulation level of said determined modulation parameter;
   a difference information output part that generates and outputs difference information indicating a difference between the adaptive modulation level of the modulation parameter used for adaptive modulation in a previous frame and that of the modulation parameter used for adaptive modulation in a current frame with one bit based on the information stored in said storage part; and
   a frame generation part generating a frame using said output difference information as modulation information to notify a receiving side of the modulation parameter used for performing adaptive modulation of said subcarrier or said subcarrier group in the current frame.

2. The wireless transmitter according to claim 1, wherein said difference information indicates an increase or decrease of said adaptive modulation level.

3. The wireless transmitter according to claim 1, wherein said difference information indicates change or maintenance of said adaptive modulation level.

4. The wireless transmitter according to claim 1, wherein, said modulation information, when being all zero or one, is an initial frame used at starting communication or a frame used at reset.

5. The wireless transmitter according to claim 1, wherein said modulation parameter contains at least one of a modulation method of each subcarrier, coding rate of transmission data, and encoding method of transmission data, and information indicating that no subcarrier exists or a subcarrier is a carrier hole carrying no information.

6. A base station apparatus, comprising the wireless transmitter according to claim 1.

7. A wireless transmitter that adaptively determines one modulation parameter from among a plurality of modulation parameters with different adaptive modulation levels based on an estimation result of propagation path conditions and performs adaptive modulation using said determined modulation parameter for each subcarrier or each subcarrier group consisting of a plurality of subcarriers, said wireless transmitter comprising:
   a storage part storing information indicating the adaptive modulation level of said determined modulation parameter;
   a difference information output part that generates and outputs difference information indicating a difference between the adaptive modulation level of the modulation parameter used for adaptive modulation in a previous frame and that of the modulation parameter used for adaptive modulation in a current frame with one bit based on information stored in said storage part;
   a selecting part that compares said estimation result of propagation path conditions with a predetermined threshold and selects one of said output difference information and information indicating said modulation parameter as modulation information to notify a receiving side of the modulation parameter used for performing adaptive modulation of said subcarrier or said subcarrier group in the current frame; and
   a frame generation part generating a frame using one of said selected difference information and information indicating the modulation parameter.

8. The wireless transmitter according to claim 7, wherein said frame generation part causes said frame to contain information indicating that said modulation information is one of said difference information and information indicating the modulation parameter.

9. A wireless receiver used in a wireless communication system that adaptively determines one modulation parameter from among a plurality of modulation parameters with different adaptive modulation levels based on an estimation result of propagation path conditions and performs adaptive modulation using said determined modulation parameter for each subcarrier or each subcarrier group consisting of a plurality of subcarriers, said wireless receiver comprising:
   a receiving part receiving a frame transmitted from a transmitting side;
   an extraction part extracting 1-bit difference information indicating a difference between the adaptive modulation level of the modulation parameter used for adaptive modulation in a previous frame and that of the modulation parameter used for adaptive modulation in a current frame as modulation information to notify a receiving side of the modulation parameter used for performing adaptive modulation of said subcarrier or said subcarrier group in the current frame from said received frame; and
   a determination part determining the adaptive modulation level of the modulation parameter used for demodulation in the current frame based on said extracted difference information and the adaptive modulation level of the modulation parameter used for demodulation in the previous frame.

10. A wireless receiver used in a wireless communication system that adaptively determines one modulation parameter from among a plurality of modulation parameters with different adaptive modulation levels based on an estimation result of propagation path conditions and performs adaptive modulation using said determined modulation parameter for each subcarrier or each subcarrier group consisting of a plurality of subcarriers, said wireless receiver comprising:

a receiving part receiving a frame transmitted from a transmitting side;

an extraction part extracting one of 1-bit difference information indicating a difference between the adaptive modulation level of the modulation parameter used for adaptive modulation in a previous frame and that of the modulation parameter used for adaptive modulation in a current frame and information indicating said modulation parameter as modulation information to notify a receiving side of the modulation parameter used for performing adaptive modulation of said subcarrier or said subcarrier group in the current frame from said received frame and extracting information indicating that said modulation information is one of said difference information and information indicating the modulation parameter from said received frame; and a determination part determining, if said modulation information is said difference information, the adaptive modulation level of the modulation parameter used for demodulation in the current frame based on said extracted difference information and the adaptive modulation level of the modulation parameter used for demodulation in the previous frame.

11. The wireless receiver according claim 9 or 10, wherein said difference information indicates change or maintenance of said adaptive modulation level.

12. The wireless receiver according claim 11, wherein, if said difference information indicates change in said adaptive modulation level, said determination part determines the adaptive modulation level of the modulation parameter used for demodulation in the current frame, based on a threshold, which is a threshold of the adaptive modulation level determined by the estimation result of propagation path conditions and also a threshold of the adaptive modulation level of the modulation parameter used for demodulation in the previous frame, and the estimation result of propagation path conditions in the current frame.

13. The wireless receiver according claim 11, further comprising:

an estimation result storage part storing said estimation result of propagation path conditions, wherein, if said difference information indicates change in said adaptive modulation level, said determination part determines the adaptive modulation level of the modulation parameter used for demodulation in the current frame, based on the estimation result of propagation path conditions in the previous frame stored in said estimation result storage part and that of propagation path conditions in the current frame.

14. A mobile station device, comprising the wireless receiver according to claim 9.

15. The wireless receiver according claim 9 or 10, wherein said difference information indicates an increase or decrease of said adaptive modulation level.

\* \* \* \* \*